US011509956B2

(12) United States Patent
Sidhu et al.

(10) Patent No.: US 11,509,956 B2
(45) Date of Patent: Nov. 22, 2022

(54) SYSTEMS AND METHODS FOR ASSESSING VIEWER ENGAGEMENT

(71) Applicant: TVision Insights, Inc., Cambridge, MA (US)

(72) Inventors: Inderbir Sidhu, Lexington, MA (US); Yanfeng Liu, Long Island City, NY (US); Yun Fu, Brookline, MA (US)

(73) Assignee: TVISION INSIGHTS, INC., Cambridge, MA (US)

(*) Notice: Subject to any disclaimer, the term of this patent is extended or adjusted under 35 U.S.C. 154(b) by 0 days.

(21) Appl. No.: 17/650,193

(22) Filed: Feb. 7, 2022

(65) Prior Publication Data
US 2022/0159341 A1 May 19, 2022

Related U.S. Application Data

(60) Division of application No. 15/702,229, filed on Sep. 12, 2017, now abandoned, which is a continuation of
(Continued)

(51) Int. Cl.
H04N 21/442 (2011.01)
H04N 21/422 (2011.01)
(Continued)

(52) U.S. Cl.
CPC ...... H04N 21/44218 (2013.01); H04H 60/33 (2013.01); H04H 60/45 (2013.01);
(Continued)

(58) Field of Classification Search
CPC ........ H04H 60/33; H04H 60/45; H04H 60/58; H04N 21/25883; H04N 21/42203;
(Continued)

(56) References Cited

U.S. PATENT DOCUMENTS 7,203,338 B2   4/2007   Ramaswamy et al.
7,260,837 B2   8/2007   Abraham et al.
(Continued)

FOREIGN PATENT DOCUMENTS

JP   2014086955 A   5/2014
JP   2015198428 A   11/2015

OTHER PUBLICATIONS

International Search Report and Written Opinion dated Jul. 13, 2017 for International Application No. PCT/US2017/012531.
(Continued)

Primary Examiner — Rong Le
(74) Attorney, Agent, or Firm — Martensen IP; Barbara B. Courtney

(57) ABSTRACT

A system for quantifying viewer engagement with a video playing on a display includes at least one camera to acquire image data of a viewing area in front of the display. A microphone acquires audio data emitted by a speaker coupled to the display. The system also includes a memory to store processor-executable instructions and a processor. Upon execution of the processor-executable instructions, the processor receives the image data and the audio data and determines an identity of the video displayed on the display based on the audio data. The processor also estimates a first number of people present in the viewing area and a second number of people engaged with the video. The processor further quantifies the viewer engagement of the video based on the first number of people and the second number of people.

25 Claims, 20 Drawing Sheets

Related U.S. Application Data application No. PCT/US2017/012531, filed on Jan. 6, 2017.

(60) Provisional application No. 62/275,699, filed on Jan. 6, 2016.

(51) Int. Cl.

| | | |
|---|---|---|
| *H04N 21/4223* | (2011.01) | |
| *H04N 21/258* | (2011.01) | |
| *H04N 21/44* | (2011.01) | |
| *H04H 60/45* | (2008.01) | |
| *H04H 60/33* | (2008.01) | |
| *H04N 21/658* | (2011.01) | |
| *H04N 21/437* | (2011.01) | |
| *H04N 21/439* | (2011.01) | |
| *H04H 60/58* | (2008.01) | |
| *H04N 5/33* | (2006.01) | |
| *G06V 10/143* | (2022.01) | |
| *G06V 40/18* | (2022.01) | |
| *G06V 40/10* | (2022.01) | |
| *G06V 40/16* | (2022.01) | |
| *H04N 5/247* | (2006.01) | |

(52) U.S. Cl.
CPC ... *H04N 21/25883* (2013.01); *H04N 21/4223* (2013.01); *H04N 21/42203* (2013.01); *H04N 21/437* (2013.01); *H04N 21/4394* (2013.01); *H04N 21/44008* (2013.01); *H04N 21/44226* (2020.08); *H04N 21/6582* (2013.01); *G06V 10/143* (2022.01); *G06V 40/103* (2022.01); *G06V 40/161* (2022.01); *G06V 40/171* (2022.01); *G06V 40/172* (2022.01); *G06V 40/174* (2022.01); *G06V 40/178* (2022.01); *G06V 40/18* (2022.01); *H04H 60/58* (2013.01); *H04N 5/247* (2013.01); *H04N 5/33* (2013.01); *H04N 5/332* (2013.01)

(58) Field of Classification Search
CPC .............. H04N 21/4223; H04N 21/437; H04N 21/4394; H04N 21/44008; H04N 21/44218; H04N 21/44226; H04N 21/6582; H04N 5/247; H04N 5/33; H04N 5/332

See application file for complete search history.

(56) References Cited

U.S. PATENT DOCUMENTS

| | | |
|---|---|---|
| 7,609,853 B2 | 10/2009 | Ramaswamy et al. |
| 8,235,725 B1 | 8/2012 | Hill |
| 8,456,293 B1 | 6/2013 | Trundle |
| 8,561,095 B2 | 10/2013 | Dimitrova et al. |
| 8,607,295 B2 | 12/2013 | Bhatia |
| 8,667,520 B2 | 3/2014 | Bhatia |
| 8,863,196 B2 | 10/2014 | Patil |
| 8,997,132 B1 | 3/2015 | Rowe |
| 9,083,988 B1 | 7/2015 | Rowe |
| 9,146,990 B2 | 9/2015 | Scherf |
| 9,161,066 B1 | 10/2015 | Oztaskent |
| 9,218,122 B2 | 12/2015 | Thomas |
| 9,224,048 B2 | 12/2015 | Deng |
| 9,288,387 B1 | 3/2016 | Keller |
| 9,368,105 B1 | 6/2016 | Freed |
| 9,531,998 B1 | 12/2016 | Farrell |
| 9,544,650 B1 | 1/2017 | Oztaskent |
| 9,667,584 B2 | 5/2017 | Archibong |
| 9,838,755 B1 | 12/2017 | Kodige |
| 9,980,002 B2 | 5/2018 | Yan |
| 10,205,988 B1 | 2/2019 | Waterman |
| 10,356,142 B1 | 7/2019 | Rajagopalan |
| 10,587,921 B2 | 3/2020 | Cho |
| 10,631,029 B1 | 4/2020 | Nijim |
| 10,841,651 B1 | 11/2020 | Karnezos |
| 10,885,092 B2 | 1/2021 | Cruz Huertas |
| 10,904,617 B1 | 1/2021 | Labarre |
| 2003/0093784 A1 | 5/2003 | Dimitrova et al. |
| 2003/0142745 A1 | 7/2003 | Osawa |
| 2005/0038749 A1 | 2/2005 | Fitch et al. |
| 2005/0289582 A1 | 12/2005 | Tavares et al. |
| 2006/0259923 A1 | 11/2006 | Chiu |
| 2007/0233759 A1 | 10/2007 | Tomlinson |
| 2007/0271580 A1 | 11/2007 | Tischer et al. |
| 2008/0097749 A1 | 4/2008 | Xie et al. |
| 2009/0030780 A1 | 1/2009 | York et al. |
| 2009/0061841 A1 | 3/2009 | Chaudhri |
| 2009/0111463 A1 | 4/2009 | Simms |
| 2009/0138805 A1 | 5/2009 | Hildreth |
| 2009/0160731 A1 | 6/2009 | Schuler |
| 2010/0066485 A1 | 3/2010 | Hyatt |
| 2010/0107184 A1 | 4/2010 | Shintani |
| 2010/0211439 A1 | 8/2010 | Marci et al. |
| 2011/0069940 A1 | 3/2011 | Shimy |
| 2011/0163939 A1 | 7/2011 | Tam |
| 2011/0313849 A1 | 12/2011 | Brueck et al. |
| 2012/0011550 A1 | 1/2012 | Holland |
| 2012/0245978 A1 | 9/2012 | Jain et al. |
| 2013/0027613 A1 | 1/2013 | Kim |
| 2013/0036200 A1 | 2/2013 | Roberts |
| 2013/0040572 A1 | 2/2013 | Berrett et al. |
| 2013/0061257 A1 | 3/2013 | Takaya et al. |
| 2013/0094538 A1 | 4/2013 | Wang |
| 2013/0145403 A1 | 6/2013 | Sofos |
| 2013/0167168 A1 | 6/2013 | Ellis |
| 2013/0173765 A1 | 7/2013 | Korbecki |
| 2013/0276012 A1* | 10/2013 | Ingram ............ H04N 21/41265 725/18 |
| 2013/0298146 A1 | 11/2013 | Conrad |
| 2013/0339433 A1 | 12/2013 | Li et al. |
| 2014/0002749 A1 | 1/2014 | Pora |
| 2014/0026158 A1 | 1/2014 | Rowe |
| 2014/0068692 A1 | 3/2014 | Archibong |
| 2014/0130087 A1 | 5/2014 | Cho |
| 2014/0172579 A1* | 6/2014 | Peterson ............ G06Q 30/0269 705/14.66 |
| 2014/0181910 A1 | 6/2014 | Fingal |
| 2014/0192325 A1 | 7/2014 | Klin et al. |
| 2014/0245335 A1 | 8/2014 | Holden |
| 2014/0259034 A1 | 9/2014 | Terrazas |
| 2014/0282665 A1 | 9/2014 | Arini |
| 2014/0282684 A1 | 9/2014 | Keen |
| 2014/0317646 A1* | 10/2014 | Garza ................ H04N 21/4223 725/12 |
| 2014/0325057 A1 | 10/2014 | Borawski |
| 2014/0344017 A1 | 11/2014 | Deephanphongs |
| 2014/0359647 A1 | 12/2014 | Shoemake et al. |
| 2014/0363059 A1 | 12/2014 | Hurewitz |
| 2015/0005011 A1 | 1/2015 | Nehrenz et al. |
| 2015/0023546 A1 | 1/2015 | Strein |
| 2015/0026708 A1 | 1/2015 | Ahmed et al. |
| 2015/0067708 A1 | 3/2015 | Jensen |
| 2015/0070516 A1 | 3/2015 | Shoemake |
| 2015/0150031 A1 | 5/2015 | Gibbon |
| 2015/0319492 A1 | 5/2015 | Lee et al. |
| 2015/0193899 A1 | 7/2015 | Oztaskent et al. |
| 2015/0281774 A1 | 10/2015 | Atkin |
| 2015/0365722 A1 | 12/2015 | Oztaskent |
| 2016/0021412 A1 | 1/2016 | Zito, Jr. |
| 2016/0057497 A1 | 2/2016 | Kim |
| 2016/0066034 A1 | 3/2016 | Hicks |
| 2016/0080448 A1 | 3/2016 | Spears |
| 2016/0088325 A1 | 3/2016 | Rowe et al. |
| 2016/0165409 A1 | 6/2016 | Bulut |
| 2016/0182955 A1 | 6/2016 | Klappert |
| 2016/0196758 A1 | 7/2016 | Causevic et al. |
| 2016/0261911 A1* | 9/2016 | Soundararajan ............................ H04N 21/44218 |
| 2016/0344873 A1 | 11/2016 | Jenzeh |
| 2016/0345062 A1 | 11/2016 | Klappert |
| 2017/0055118 A1 | 2/2017 | Ciecko |

(56) References Cited

U.S. PATENT DOCUMENTS

| | | |
|---|---|---|
| 2017/0134803 A1 | 5/2017 | Shaw |
| 2017/0149795 A1 | 5/2017 | Day, II |
| 2017/0150213 A1 | 5/2017 | Cremer |
| 2017/0185276 A1 | 6/2017 | Lee |
| 2017/0270560 A1 | 9/2017 | Duggal |
| 2017/0280394 A1 | 9/2017 | Kim |
| 2017/0289807 A1 | 10/2017 | Mendonca |
| 2018/0005062 A1 | 1/2018 | Aguera-Arcas |
| 2018/0020963 A1 | 1/2018 | Friant |
| 2018/0040324 A1 | 2/2018 | Wilberding |
| 2018/0063263 A1 | 3/2018 | Bandela |
| 2018/0098122 A1 | 4/2018 | Cho |
| 2018/0098133 A1 | 4/2018 | Liassides |
| 2018/0146231 A1 | 5/2018 | Saeedasr |
| 2018/0183874 A1 | 6/2018 | Cook |
| 2018/0233145 A1 | 8/2018 | Bathiche |
| 2018/0310042 A1 | 10/2018 | Mayalil |
| 2018/0343324 A1 | 11/2018 | Zhu |
| 2018/0376205 A1 | 12/2018 | Oswal |
| 2019/0220669 A1 | 7/2019 | Gross |
| 2020/0396517 A1 | 12/2020 | Hodge |
| 2020/0412728 A1 | 12/2020 | Gupta |
| 2021/0377331 A1 | 12/2021 | Lapointe |

OTHER PUBLICATIONS

Extended European Search Report dated Nov. 26, 2020 for European Patent Application No. 18787533.1.
Extended European Search Report dated Mar. 26, 2019 for European Patent Application No. 17736432.0.
https://www.switch-m.com/ retrieved from the Internet Dec. 18, 2017.

* cited by examiner

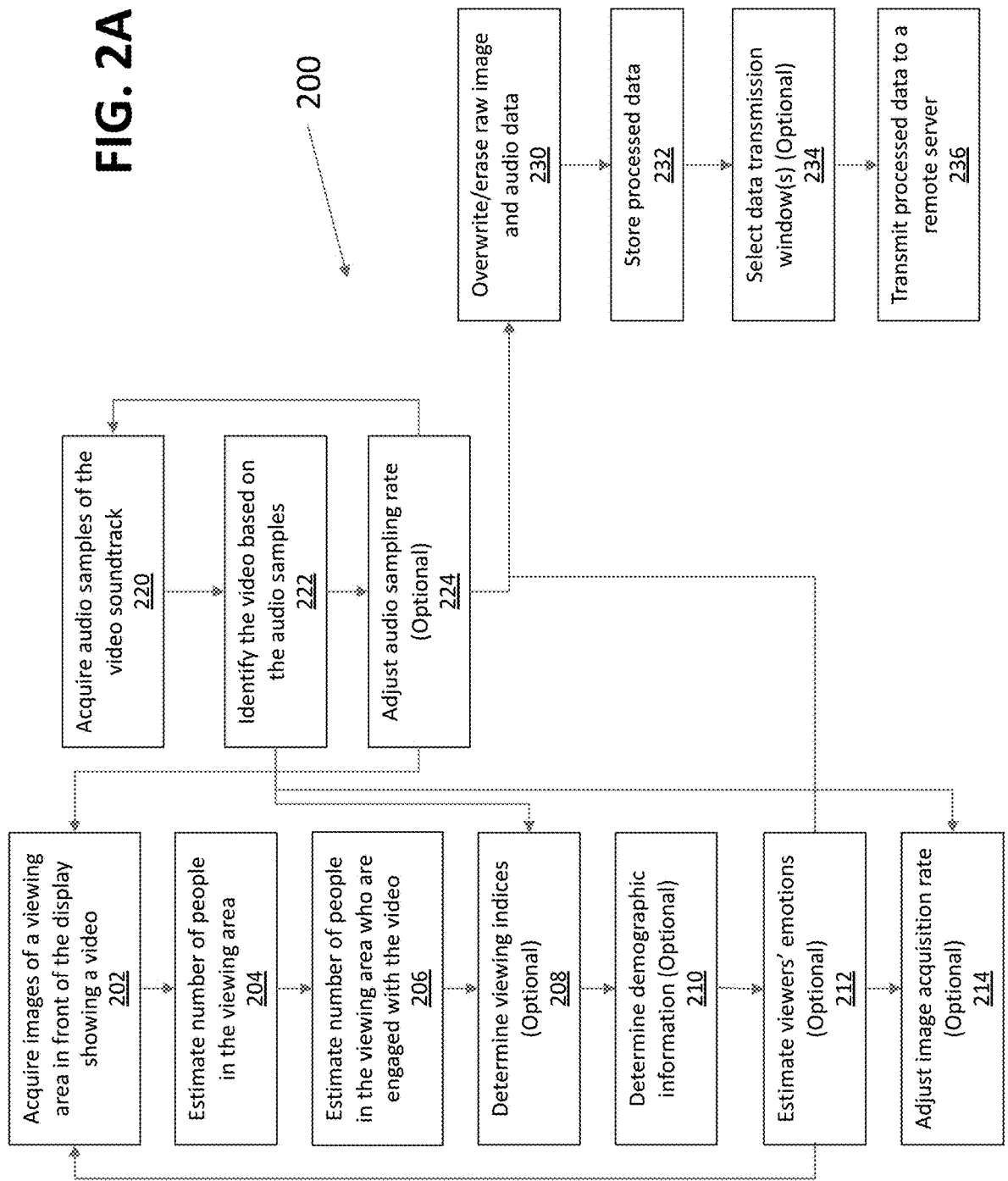

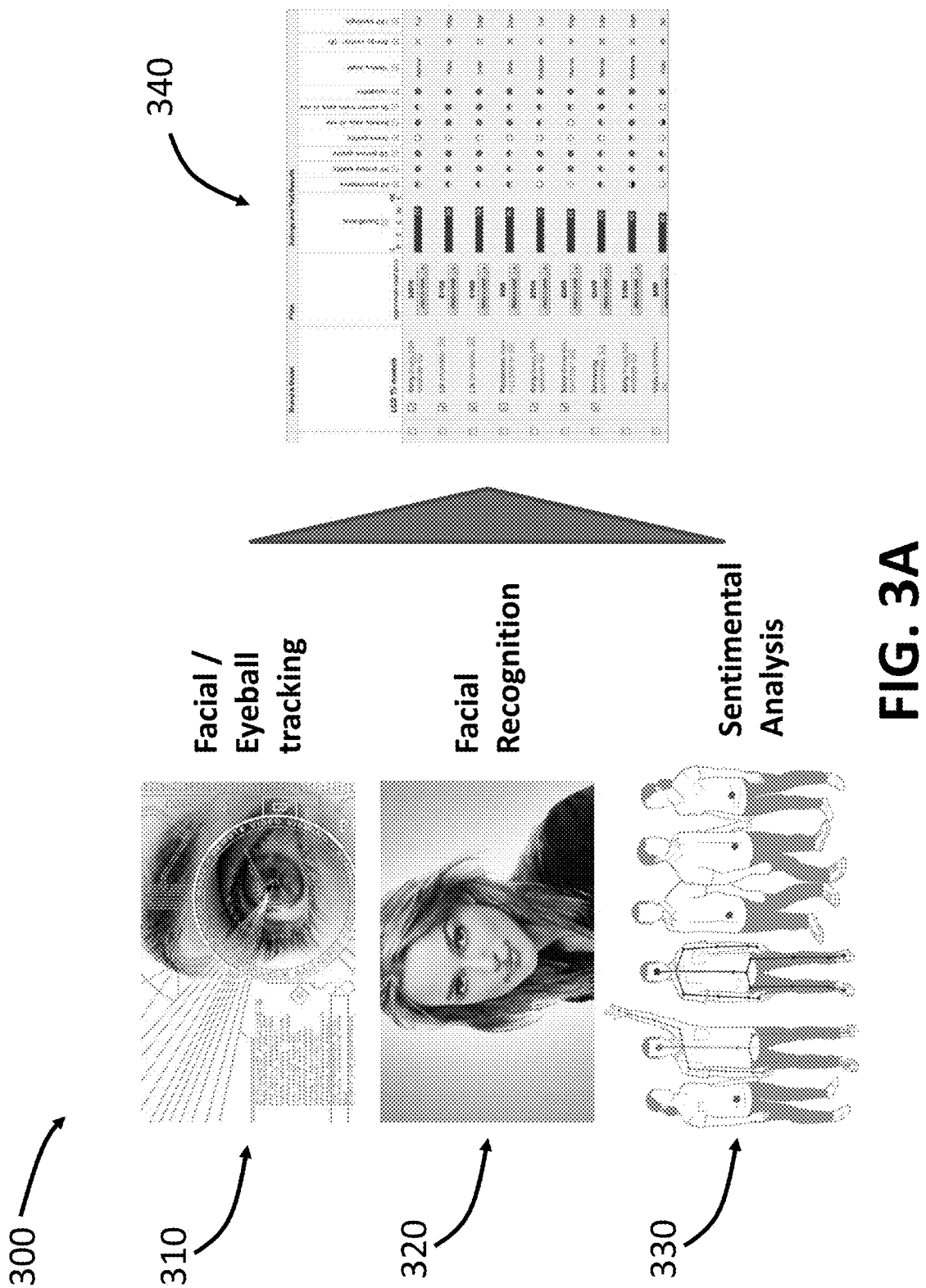

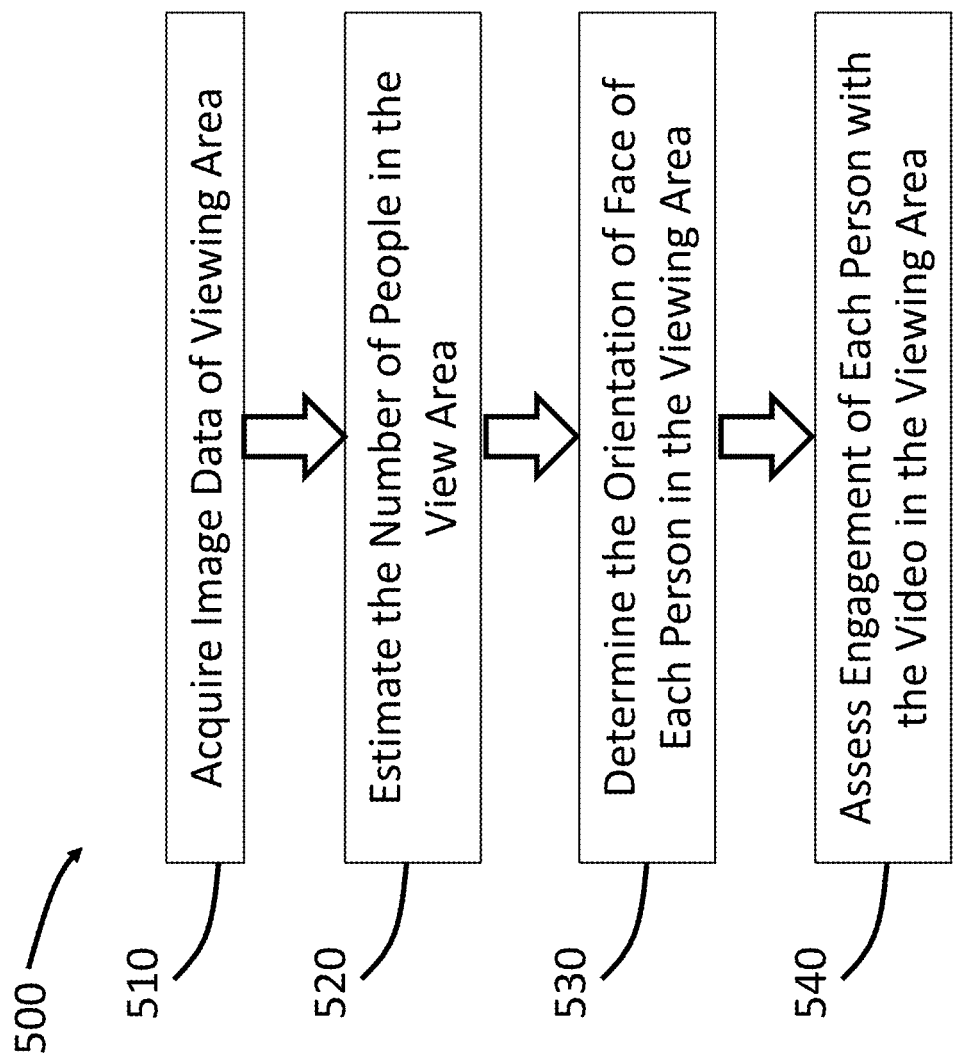

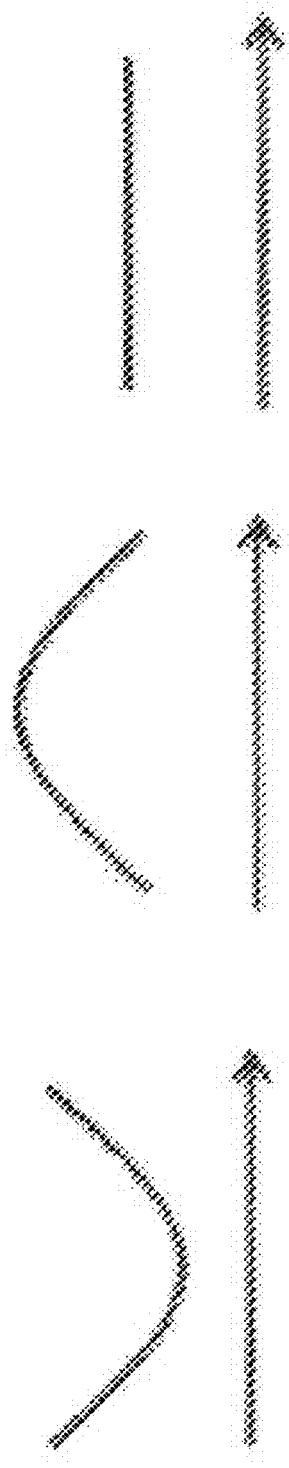
A. Downward convex
FIG. 8A
B. Upward convex
FIG. 8B
C. Parallel
FIG. 8C
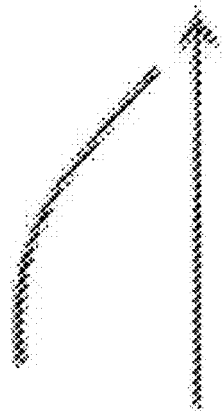
D. Increases Monotonically
FIG. 8D
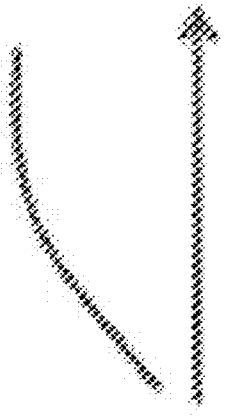
E. Decreases Monotonically
FIG. 8E

G. Two mountains

F. No regularity

SYSTEMS AND METHODS FOR ASSESSING VIEWER ENGAGEMENT

CROSS-REFERENCE TO RELATED APPLICATION(S)

This application is a divisional application of U.S. application Ser. No. 15/702,229 filed 12 Sep. 2017, which is a bypass continuation of PCT Application No. PCT/US2017/012531, filed 6 Jan. 2017, which relates to and claims the benefit of priority to U.S. Provisional Application Ser. No. 62/275,699, filed 6 Jan. 2016, all of which are hereby incorporated by reference in their entirety for all purposes as if fully set forth herein.

BACKGROUND

Conventional methods of TV audience measurements include using people meters and diaries to collect data from the audience. These methods typically try to recognize humans (potential audience members) in a room where a TV set is placed. The methods may also involve capturing a series of images (e.g., TV programs or commercial advertisements) playing on the TV. Then for each image, the number of people in the room at the time when a particular image is displayed can be estimated.

These methods have several flaws. First, the data collected by these methods normally only include the number of people in the room where the TV is placed. The data typically gives no indication of how often the viewer is actually watching the TV (the measurement takes place when the TV is on). Second, the collected data may indicate how often people are tuning to specific channels. However, it does not gauge their reaction to the programs or advertisements and therefore provides no indication of the effectiveness of the programs or advertisements. Third, TV ratings are not given for specific demographics in the household or in the community.

SUMMARY

Embodiments of the present invention include apparatus, systems, and methods of assessing viewer engagement of a TV audience. In one example, a system for quantifying viewer engagement with a video playing on a display includes at least one camera, disposed to image a viewing area in front of the display, to acquire image data of the viewing area. A microphone is disposed in proximity to the display to acquire audio data emitted by a speaker coupled to the display. The system also includes a memory, operably coupled to the camera and the microphone, to store processor-executable instructions and a processor, operably coupled to the camera, the microphone, and the memory. Upon execution of the processor-executable instructions, the processor receives the image data from the camera and the audio data from the microphone and determines an identity of the video displayed on the display based at least in part on the audio data. The processor also estimates, based at least in part on the image data, a first number of people present in the viewing area and a second number of people engaged with the video in the viewing area. The processor further quantifies the viewer engagement of the video based at least in part on the first number of people and the second number of people.

In another example, a method of quantifying viewer engagement with a video shown on a display includes acquiring, with at least one camera, images of a viewing area in front of the display while the video is being shown on the display. The method also includes acquiring, with a microphone, audio data representing a soundtrack of the video emitted by a speaker coupled to the display. The method further includes determining, with a processor operably coupled to the camera and the processor, an identity of the video based at least in part on the audio data and estimating, with the processor and based at least in part on the image data, a first number of people present in the viewing area while the video is being shown on the display and a second number of people engaged with the video in the viewing area. The method also includes transmitting, by the processor, the identity of the video, the first number of people, and the second number of people to a remote server.

In yet another example, a system for assessing viewer engagement with a video playing on a display is disclosed. The display is coupled to a speaker emitting a soundtrack of the video. The system includes a visible camera to acquire visible images of a viewing area in front of the display at a first sample rate while the video is playing on the display. An infrared camera is included in the system to acquire infrared images of the viewing area in front of the display while the video is playing on the display at the first sample rate. A microphone is disposed in proximity to the display to acquire samples of the soundtrack emitted by the speaker while the video is playing on the display at a second sample rate lower than the first sample rate. The system also includes a processor, operably coupled to the visible camera, the infrared camera, and the microphone, to: (i) identify the video based on the samples of the soundtrack, (ii) estimate, based on the visible images and the infrared images, a number of people in the viewing area while the video is playing on the display and a number of people engaged with the video, and (iii) overwrite, erase, and/or discard the samples of the soundtrack, the visible images, and the infrared images. The system also includes a memory, operably coupled to the processor, to store representations of an identity of the video, the number of people in the viewing area while the video is playing on the display, and the number of people engaged with the video. The system further includes a network interface, operably coupled to the processor, to transmit the representations to a server.

In yet another example, a method of quantifying viewer engagement for unique videos in a plurality of videos includes at each household in a plurality of households, acquiring image data of a viewing area in front of a display and determining if the display is showing a video in the plurality of videos. The method also includes, for each unique video in the plurality of videos, estimating (i) a viewing rate and (ii) a watching rate based on the image data and on demographic information about each household in the plurality of households. The viewing rate represents a ratio of a total number of people in the viewing areas to a total number of displays showing videos and the watching rate representing a ratio of a total number of people in households with display showing videos to a total number of people in the plurality of households. The method also includes, for each unique video in the plurality of videos, determining a viewability index based on the viewing rate and the watching rate.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2A illustrates a method of quantifying user engagement using the system shown in FIG. 1.

FIG. 3A illustrates methods of viewer engagement including facial and eyeball tracking, facial recognition, and sentimental analysis.

FIG. 5 illustrates a process for assessing viewer engagement including determining the orientation of the face of each person in a viewing area.

FIGS. 8A-8G show commercial message (CM) curves acquired using the architecture shown in FIG. 7.

DETAILED DESCRIPTION

Figure 1:
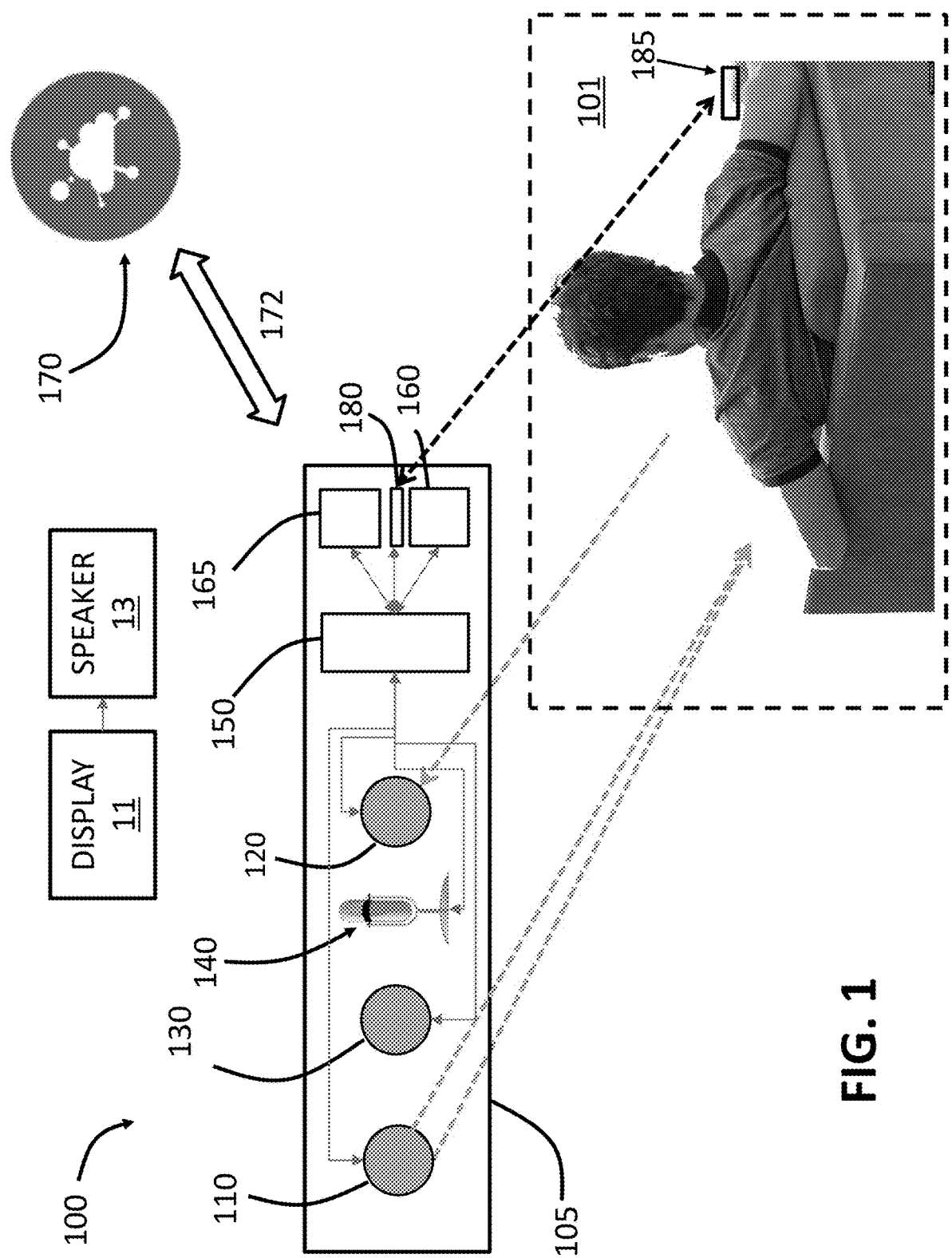
FIG. 1 shows a schematic of a system for assessing viewer engagement of TV audiences.

To address shortcomings in conventional methods of TV audience measurements, systems and methods disclosed herein acquire image data of a viewing area in front of a display (e.g., a TV, computer, or tablet) that is playing a video (e.g., a TV show, movie, web show, advertisement, or other content). An example system determines how many people are in the viewing area and which of those people are actually watching the video from the image data. The system also samples the soundtrack of the video with a microphone and identifies the videos using the samples of the soundtrack. The system stores (and/or persists) information about the video, the number of people in the viewing area, and the number of people watching the video in a local memory and transmits the information to a remote server via an internet or other network connection.

Unlike previous systems for measuring viewer engagement with videos, which identify videos based on digital watermarks embedded in the videos themselves, examples of the inventive system identify videos based on the videos' soundtracks. As a result, the inventive systems do not have to be connected to the display, the set-top box, or the cable connection at the viewer's premises. This makes them easier to install and remove (and thus more likely to be adopted). It also makes them less likely to malfunction or to record "false positive" impressions caused by leaving the set-top box on while the display is off.

An inventive system also processes image data locally, i.e., on the viewer's premises, to determine the numbers of people in the viewing area and engaged with the video. It can also process audio data locally to identify the video being displayed while someone is in the viewing area. It stores this data locally, i.e., in a memory in or coupled to a local device on the viewer's premises. The processed image and audio data consumes far less memory than the raw image and audio data, so this local memory can store information covering longer time periods. In other words, an inventive device uses memory more efficiently because it stores processed data instead of raw data.

The local device processes the raw image data, which may include both visual and depth information, acquired from the viewing area to assess viewer engagement. The local device can use artificial intelligence (AI) technology and machine learning techniques to analyze a viewer's body gestures, movements, and facial orientation. The local device can also recognize individual faces in the video audience and determine each viewer's emotions from the image data. In this processing, the individual's images are not transmitted outside of the individual's premises. The recognition can be performed on the local device on premises. Each individual in the household can receive a unique identifier during the on-boarding process for that household. When a match is made during the recognition process, this identifier is assigned to the match, and this identifier can then be transmitted to remote servers. In addition, the processing is carried out over the streaming video or audio data (including images). In other words, the video or audio data is not persisted in local memory.

The local device processes the raw audio data by matching or comparing the raw audio data with samples in an audio database to identify the specific video (e.g., TV channel, program, or advertisement) that is being viewed. Alternatively, or additionally, the local device can submit a query based on the audio data to a third-party application programming interface (API), which identifies and returns an identification of the content to which the audio belongs. In some cases, the database or API may return multiple possible matches, and the remote server can select the best match using information about the TV schedule, subsequent audio samples, or data collected from other sources, including, but not limited to, the set-top box, cable/internet connection, or the content provider itself.

In some implementations, the local device does not store the raw image or audio data for later retrieval. Instead, the local device writes the raw image and audio data to one or more buffers that store the raw image and audio data for processing, then overwrites or erases the buffers after the raw image and audio data has been processed. Put differently, the local device holds the raw image and audio data merely transiently during processing. As used herein, "holding" of raw images and audio data in local devices refers to temporary storing of these data for a short time duration (e.g., less than 100 milliseconds, less than 80 milliseconds, less than 60 milliseconds, less than 50 milliseconds, or less than 40 milliseconds, including any values and sub ranges in between). Overwriting or erasing the raw image and audio data offers a number of advantages, including reducing the amount of memory required by the local device. It also enables easier compliance with data privacy laws by eliminating image or audio data that could be used to identify people, including children, in the viewing area or in range of the microphone.

Processing and storing image and audio data locally offers another technical advantage—it reduces the bandwidth required to convey information about viewing habits from the local device to the remote server. Compared to raw image and audio data, processed image and audio data consumes less memory and therefore requires less bandwidth for transmission. The processed image and audio data also fills a given memory more slowly than raw image and audio data and therefore can be transmitted to the remote server less frequently. A local device may take advantage of this flexibility by scheduling burst transmissions during times when network bandwidth usage is relatively low, e.g., late night or early morning. Transmitting processed image and audio data, which doesn't necessarily include information identifying people, including children, in the viewing area or in range of the microphone, also ensures or increases the ease of compliance with data privacy laws.

The remote server collects processed image and audio data from local devices in different households. It processes this data to assess viewer engagement across an entire community by statistically analyzing the viewer engagement information collected from the different households in the community. For example, the server can quantify the ratio of the viewer engagement from the highly granular data collected from each household to the total length of the programming that was detected.

The statistical analysis can further take into account demographic information (e.g., age, gender, household income, ethnicity, etc.) of the people watching the videos and/or the people in the household. Based on all this information, the server may calculate various indices, such as a viewability index and an attention index (both defined below), to quantify viewer engagement. These viewer engagement indices may be based on any and all information provided by the local devices, including information about the viewers' body gesture(s), movement(s), and facial orientation(s) of viewers, as well as the video information. These quantitative indices can indicate, among other things, (i) who is/are really watching display, (ii) how often an audience member looks at the display, and ii) the audience's reaction towards the programs and advertisements on the display.

The quantitative indices can then be transferred by the remote server to a central storage (e.g., a cloud-based database) where third parties, including but not limited to TV advertising agencies and TV networks, can access the indices and possibly other data as well. Alternatively, the raw data collected by the sensors can be transferred to a central storage on the cloud where it is analyzed by methods described herein and made available to interested third parties. A third party may optionally access the raw data through the system. The raw data in this example includes data collected after processing of the video and audio streams (instead of the video and audio streams themselves). Generally, speaking, the raw data can include unique identifiers of the viewers, the attentiveness of the viewer(s), and the programming being viewed by the viewer(s), on a sub second basis (e.g., every half second or less). More quantitative indices (see more details below) can be computed on the remote server using this raw data.

This acquired and analyzed data can allow a collection entity, such as a content provider or advertising agency, to accurately evaluate the impact of videos, including unprecedented measurements of individual demographics, which can be valuable to the advertisers. For example, advertising agencies can use the data to determine which commercial slots would be a best fit for their targeted audience. With demographic information, the data can be matched to the type of audience and can effectively lead to purchasing behavior, thereby increasing return on investment (ROI) in programming. TV networks can also benefit from the data as they can glean more accurate ratings of their TV programs, audience type, reactions, and predictive ad slot value. This further allows them to improve their programs to better fit the type of audience and eliminate less popular shows, in addition to determining which ad slots may have the highest value for a particular target demographic.

The acquired and analyzed data also allows various business models. For example, a collection entity can provide performance-based TV ratings data and raw data for analysis, which is collected from a motion-sensing device put into selected-user households that represent a national and/or local demographic, to TV networks, advertising agencies, and other interested third parties and indirectly to advertisers who obtain the data from advertising agencies.

Systems of Assessing Viewer Engagement

FIG. 1 illustrates a schematic view of a system 100 for assessing viewer engagement in a household, a sports bar, or other space with a display. The system 100 includes a local device 105 disposed in each household to collect viewer engagement data and a remote server 170, such as a cloud storage and computing device that includes a memory to store data and a processor (also called a remote processor) to analyze data. The local device 105 is communicatively coupled to the remote server 170 via a network connection 172, such as an internet connection. For instance, the local device 105 may include a network interface 165, such as a WiFi antenna or Ethernet port, for connecting to a household local area network (LAN). This LAN is in turn connected to a wide area network (WAN), e.g., via a cable or fiber optic connection provided by an Internet Service Provider (ISP).

The local device 105 in FIG. 1 includes an infrared (IR) emitter 110 to illuminate a viewing area 101 in front of a display 11, such as a television (TV), computer screen, tablet, or other device, with IR light. This IR light may be structured or modulated to produce an illumination pattern that scatters or reflects off objects (including the human audience) in the viewing area 101. The local device 105 also includes an IR sensor 120 that detects the IR light reflected or scattered by these objects. A processor 150 (also called a local processor 150) coupled to the IR emitter 110 and IR sensor 120 uses information about the illumination pattern and the detected IR light to produce one or more IR depth images or IR depth maps of the viewing area 101. More specifically, the processor 150 converts information derived from the reflected beams into depth information measuring the distance between a viewer and the sensor 120. The processor 150 uses these IR depth images to determine how many people are in the viewing area and which of those people are watching the display. The processor 150 may also derive information from the IR depth images about the identities of the people watching the display, possibly by recognizing their faces or gestures or determining their demographics (e.g., age, gender, etc.).

The local device 105 further includes an RGB sensor 130 (also referred to as a visible camera) that captures color images of the viewing area 101. The processor 150 is also coupled to the RGB sensor and may use the color images, alone or in combination with the IR depth images, to estimate the number of people are in the viewing area, the number of people engaged with the display, and information about the people in the viewing area. The color images can also be used for facial recognition. In some cases, the processor 150 uses both the color images and the IR depth images to improve the fidelity of the estimates of the numbers of people in the viewing area and engaged with the video.

The local device 105 also includes one or more microphones 140 positioned to detect sound emitted by a speaker 13 coupled to the display 11. In operation, the speaker 13 plays the soundtrack of the video shown on the display 11. And the microphone 140 captures audio samples of the soundtrack played by the speaker 13. The processor 150, which is coupled to the microphone 140, uses these audio samples to create an audio fingerprint of the video (soundtrack), which it compares with other audio fingerprints in a proprietary or third-party database to identify the video being shown on the display 11.

The system 100 can further include a Bluetooth receiver 180 matched with a Bluetooth transmitter 185. In some cases, the Bluetooth transmitter 185 can be included in a wristband or a wristwatch worn by the viewer. In operation, the Bluetooth transmitter 185 transmits a low power Bluetooth beacon, which is received by the Bluetooth receiver 180. The processor 150 can then gauge the viewer's distance from the display 11 based on the received Bluetooth beacon. In addition, each Bluetooth transmitter 185 can have a unique ID that can be recognized by the processor 150. The transmitter ID can be further associated with a unique viewer (e.g., each viewer in the household has his or her own transmitter). In this manner, the identity of the viewer can also be determined.

In some cases, the system 100 can include more than one Bluetooth receiver. These receivers can be disposed at different locations such that each receiver can receive different Bluetooth signal strength from the transmitter 185. This configuration can allow the processor 150 to estimate not only the distance of the viewer from the display 11 but also the relative location of the viewer (e.g., to the left or right of the display 11).

The system 100 may include other motion-sensing devices, such as a 3-axis accelerometer to detect position and motion. The motion-sensing device can be connected, for example, via a USB cable with a data-analyzing and processing device such as a desktop machine.

FIG. 1 shows the data collection components—here, the IR emitter 110, IR sensor 120, RGB sensor 130, and microphone 140—as part of the local device 105 (e.g., within the same housing). In other embodiments, one or more of these components may be implemented as separate devices that are coupled to the processor 150 by one or more wired connections, such as USB connections, RS 232 connections, Ethernet connections, fiber connections, or one or more wireless connections, such as WiFi connections, Bluetooth connections, other RF connections, or infrared connections. For instance, the IR emitter 110 and IR sensor 120 may be (in) a commercially available device, such as a Microsoft Kinect, that is connected to the processor 150. Likewise, the microphone 140 may be implemented as an array of microphones that are placed around the viewing area or close to the speaker 13. A microphone array may be better able to extract voice input from ambient noises. The local device 105 may include or be coupled to other sensors as well.

The processer 150 in the system 100 is employed to process the raw data acquired by the sensors, including the IR emitter 110, the IR sensor 120, the RGB sensor 130, and the microphone 140. The processing can be carried out upon execution of processor-executable instructions that are stored in a memory 160 coupled to the processor 150. In one example, a user can manually store the instructions in the memory 160 by downloading the instructions from the remote server 170. In another example, the local device 105 can be configured to (routinely) check whether there are updated instructions available for downloading from the remote server 170. If so, the local device 105 can automatically download the update via the network connection 172 and the network interface 165. In yet another example, the remote server 170 can be configured to send a notification to the local device 105 when an update or a set of new instructions is ready for downloading. Upon receiving the notification, a user can decide whether to download and/or install the update. In yet another example, the remote server 170 can be configured to send update notification to another user device, such as a smartphone. Upon receiving the notification, the user can decide whether the download and/or install the update.

The memory 160 in the local device 105 also stores the processed data (e.g., the estimate of the number of people in the viewing area, the estimate of the number of people engaged with the display, and the identification of the video, as well as any demographic information or indices derived from the raw image and audio data). Once the memory 160 has accumulated enough processed data, the processor 150 transmits the processed data to the remote server 170 via the network interface 165 and the network connection 172 for aggregation, further processing, and reporting. The local memory 160 also temporarily holds the image and audio data during the local processing. In some cases, this processing is completed in less than a quarter of a second.

Collecting and Processing Image and Audio Data with a Local Device

FIG. 2A illustrates a process 200 for collecting and processing image and audio data acquired with a system like the system 100 shown in FIG. 1. As described above, the system can include a visible sensor, an IR sensor, or both to images of the viewing area in front of the display (202). In one example, the RGB sensor 130 and the IR sensor 120 operate independently from each other; the sensors acquire images in an unsynchronized fashion. In another example, the image acquisition by the RGB sensor 130 and the IR sensor 120 is substantially synchronized. Each time the RGB sensor 130 acquires a visible image, the IR sensor 120 acquires an IR image, e.g., at the same time or in an interleaved fashion.

A local processor (e.g., processor 150) detects the number of people in the images of the viewing area (204) and also determines which of those people are engaged with the display (206). For instance, the local processor may use the techniques described below, including skeleton detection techniques, facial recognition techniques, and eye tracking techniques as known in the art of computer vision/image processing. In some cases, the local processor 150 can determine additional indices related to the duration of each viewer's presence in the viewing area, the duration of each viewer's engagement with the display, and the identity of the video being displayed (208), which can be derived from audio data as described below (222).

The local processor can further identify each person detected in the viewing area 101, on a demographic level (e.g., man aged 25-30, girl aged 12-15) (210). If the local processor 150 has access to information about the household where the local device 105 is placed, e.g., via the local memory 160 or the remote server 170, it may use this demographic information to provide more confident demographic information estimates of each person detected in the viewing area 101. The local processor may even identify the particular people in the household who are in the viewing area.

The local processor 150 can also estimate the mood or emotion of each person detected in the viewing area 101 (212). The emotions that can be determined by the processor 150 can include, for example, happy, sad, or neutral. The classification of a viewer's emotion, when watching a video on the display 11, can be used to gauge the viewer's reaction to the video, thereby facilitating targeted delivery of advertisement.

To estimate the mood or emotion of each person, the local processor 150 can capture the visual information (e.g., from the images of the viewing area 101) in real-time from both RGB and IR channels. The visual information can be further processed to extract patterns and features that can be signatures of different mood or emotion states. The features extracted from both channels can be fused as a unified feature. A classifier can be trained to take such feature as input. Estimation of emotion/mood can be then made based on the classifier/s response to certain patterns in each time.

In some cases, the estimation of mood or emotion can be achieved by the following method. The method includes collecting training images with people displaying various emotions, such as, smiling and frowning, among others. Features representative of each emotion are extracted (e.g., by a processor) from these training images. The features and the images are then used to train a classifier to correlate each feature to a corresponding emotion. In this manner, the classifier can assign these features to the various emotions. The method also includes deploying the classifier on the local device so as to recognize the viewers emotions in real time.

In cases where the system collects visible and IR images in a synchronized fashion, the visible and IR cameras can collect images for training a computer vision model used by the processor to detect people (204), count engaged viewers (206), identify viewers demographically (210), and estimate mood (212). The training can be employed to establish a "ground truth." Having collected image data from both IR and RGB sensors almost in parallel, a human can annotate the people detected in each image. This manual data can be fed to a training algorithm, giving rise to two separate models, one trained on visible RGB spectrum, and the other on the IR spectrum. The detection rate of each model against the "ground truth" is then compared to select the model that performs better. More details of this training are described below with reference to FIG. 2B.

Synchronization of the two cameras (e.g., sensors 120 and 130 in FIG. 1) can also allow the local processor to double-check the image processing. For example, the processor 150 can compare the number of people identified in each image or remove errors visible in one image and less visible or invisible in the other image. If the results are in agreement with each other, the processor 150 can record the results. If not, the processor 150 can then detect possible errors in at least one of the images. Alternatively, the processor 150 can generate an alert for a human to intervene. The processor 150 can also generate a flag associated with the data estimated from these two images, indicating that there this data might be less reliable. In subsequent analysis, this data may not be used at all, if images take shortly before or after this pair of images at issue can provide reliable people recognition.

In one example, the local device 105 uses the visible and IR sensors 120 and 130 all the time to take image data. In another example, the local device 105 can use only one of the sensors 120 or 130 to take image data. In yet another example, the local device 105 can use one sensor as a default sensor and use the other sensor as a backup sensor. For example, the local device 105 can use the RGB sensor 130 most of the time for image taking. However, if the processor 150 has trouble satisfactorily analyzing the visible images (e.g., the analysis is not as reliable as desired), the processor 150 can turn on the IR sensor 120 as backup (or vice versa). This may occur, for example, when the ambient light level in the viewing area is low.

The local processor may also adjust the image acquisition rate for the visible sensor, the IR sensor, or both based on the number of people in viewing area, their positions in the viewing area, and the identity of the video on the display (214). Generally, the image acquisition for either or both sensors can be substantially equal to or greater than about 15 frames per second (fps) (e.g., about 15 fps, about 20 fps, about 30 fps, about 50 fps or even greater, including any values and sub ranges in between). At this image acquisition rate, the sensor can detect eye movements well enough for the local processor to assess viewer engagement (206).

The local processor may increase or decrease the image acquisition rate based on the number of people in the viewing area 101. For example, if the processor determines that nobody is in the viewing area 101, it may reduce the image acquisition rate to reduce power and memory consumption. Likewise, if the processor determines that the viewer(s) are not engaged with the video (e.g., because they appear to be sleeping), it may reduce the image acquisition rate to conserve power, memory, or both. Conversely, the processor may increase the image acquisition rate (e.g., to greater than 15 fps) if the viewers appear to be shifting their attention rapidly, if they are watching a fast-paced video (e.g., a football game or action movie), if they are changing channels rapidly (e.g., channel surfing), or if the content is changing relatively rapidly (e.g., during a series of advertisements).

If the system includes both IR and visible image sensors, the local processor may also vary the image acquisition based on the lighting conditions or relative image quality. For instance, in low light conditions, the local processor may acquire IR images at a higher rate than visible images. Similarly, if the local processor gets better results processing visible images than IR images, it may acquire visible images at a higher rate than IR images (or vice versa if the opposite is true).

The system also records samples of the video's soundtrack with the microphone 140 (220). Generally, the audio data acquisition rate or audio sampling rate is lower the image acquisition rate. For instance, the microphone acquires audio samples at a rate of once every 30 seconds. In each acquisition, the microphone 140 records an audio sample having a finite duration so as to allow identification of the video associated with the audio sample. The duration of the audio sample can be substantially equal to or greater than 5 seconds (e.g., about 5 seconds, about 6 seconds, about 8 seconds, about 10 seconds, about 20 seconds, or about 30 seconds, including any values and sub ranges in between).

The local processor uses the audio samples recorded by the microphone 140 to identify the video being played on the display (222). For example, the processor 150 can create a fingerprint of the audio data and use the fingerprint to query a third-party application programming interface (API), which responds to the query with an identification of the video associated with the audio data. In another example, the processor 150 can compare the fingerprint against a local table or memory to determine the identity of the video.

As mentioned above, using samples of the video soundtrack to identify the video offers several advantages over the digital watermarks used by conventional TV survey devices to identify videos. It does not require inserting digital watermarks into the video, which eliminates the need to coordinate with content producers and providers. This simplifies content production and distribution and makes it possible to identify and assess a wider range of video content, including producers and distributors who cannot or will not provide digital watermarks. And it eliminates the need to connect the local device to the cable or set-top box.

In addition, using audio data instead of digital watermarks reduces the risk of "false positives," or instances where the system detects people in the viewing area and identifies a video that is not actually being watched even when the TV is off. This can happen with a conventional system hooked to set-top box if the household members leave their set-top box on even when their TV is off.

In some examples, the local processor adjusts the audio sampling rate (224), e.g., based on the identity of the video, the number of people in the viewing area, the number of people engaged with the video, etc. For instance, if the local processor cannot identify the video from a single fingerprint (e.g., because the video soundtrack includes a popular song that appears in many different video soundtracks), the local processor and microphone may acquire samples at a higher rate or of longer duration to improve video resolve any ambiguity. The processor may also decrease the audio sampling rate if nobody is in the viewing area 101 or the viewer(s) are not engaged with the video (e.g., because they appear to be sleeping) to conserve power, memory, or both. Conversely, the processor may increase the audio sampling rate if the viewers are changing channels rapidly (e.g., channel surfing) or if the content is changing relatively rapidly (e.g., during a series of advertisements).

Depending on the implementation, the microphone may record audio samples at regular intervals (i.e., periodically) or at irregular intervals (e.g., aperiodically or with a time-varying period). For instance, the microphone may acquire audio data throughout the day at a constant rate (e.g., about two samples per minute). In other cases, the microphone may operate at one sampling rate when the TV is on or likely to be on (e.g., early evening) and at another, lower sampling rate when the TV is off or likely to be off (e.g., early morning, mid-day). If the local processor detects that the TV has been turned on (off) from the audio samples, it may increase (decrease) the sample rate accordingly. The may also trigger the image sensors to start (stop) imaging the viewing area in response to detecting that the TV has been turned on (off) from the audio samples.

As or once the raw image and audio data has been processed, the local processor overwrites the raw image and audio data or erases the raw image and audio data from memory (230). In other words, each image is held in the memory 150, while the processor 150 detects and identifies humans and gauges their engagement and expressions. The detection, identification, and engagement data is collected per frame, and this information is persisted and eventually uploaded to the backend server 170. Similarly, the audio data is also held in the memory 160, while the third-party API is processing the audio fingerprint and returning the identity of the associated video. The identity is stored and/or uploaded to the backend server 170 as described below.

By overwriting or erasing (or otherwise discarding) the raw image and audio data, the local processor reduces demands on the memory and reduces or eliminates the ability to identify the individuals in the viewing area. This maintains the individuals' privacy by exposing less information to potential attempts to hack the system. It also eliminates the possibility of transmitting images of the individuals to third parties. This is especially beneficial for preserving the privacy of children in the viewing area in accordance with the Children's Online Privacy Protection Act.

In some cases, the local processor actively erases the raw image and audio data from the memory. In other cases, the local processor stores that raw image and data in one or more buffers in the memory that are sized not to store more than a predetermined amount of raw image and audio data (e.g., one image or one audio sample). The local processor analyzes the raw image and data in the time period between samples so that the next image or audio sample overwrites the buffer.

The local processor 150 also stores the processed data into the memory 160. The processed data may be stored in a relatively compact, such as comma-separated variable (CSV) format, to reduce memory requirements. The data included in the CSV or other file may indicate, for example, whether anyone is present in each image, the number of people in the viewing area 101 in each image, the number of people who are actually watching the display 11 in the viewing area 101, the classification of each viewer's emotion, and the identity of each viewer. The processed data may also include indications about the local device's operational state, including the IR image acquisition rate, visible image acquisition rate, audio sampling rate, current software/firmware update, etc.

The local processor transmits the processed data to the remote server (e.g., via a network interface) for storage or for further processing (236). Because the processed data is in a relatively compact format, the upload bandwidth is much lower than it would be for raw image and audio data. And because the transmitted data does not include images of the viewing area or audio samples that could include the viewers' voices, there is less risk of compromising the viewers' privacy. In addition, the audio and image portions of the processed data are more likely to be and remain synchronized because they are processed locally than if the raw image and audio image were transmitted to and processed by a remote server.

In some cases, the local processor may transmit the processed data to the remote as it is processed. In other cases, the local processor may identify transmission windows (234), e.g., based on the available upstream bandwidth, the amount of data, etc. These transmission windows may be predetermined (e.g., 2 am ET), set by a household member during local device installation, set by the remote server (e.g., via a software or firmware update), or determined by the local processor based on bandwidth measurements.

Figure 2B:
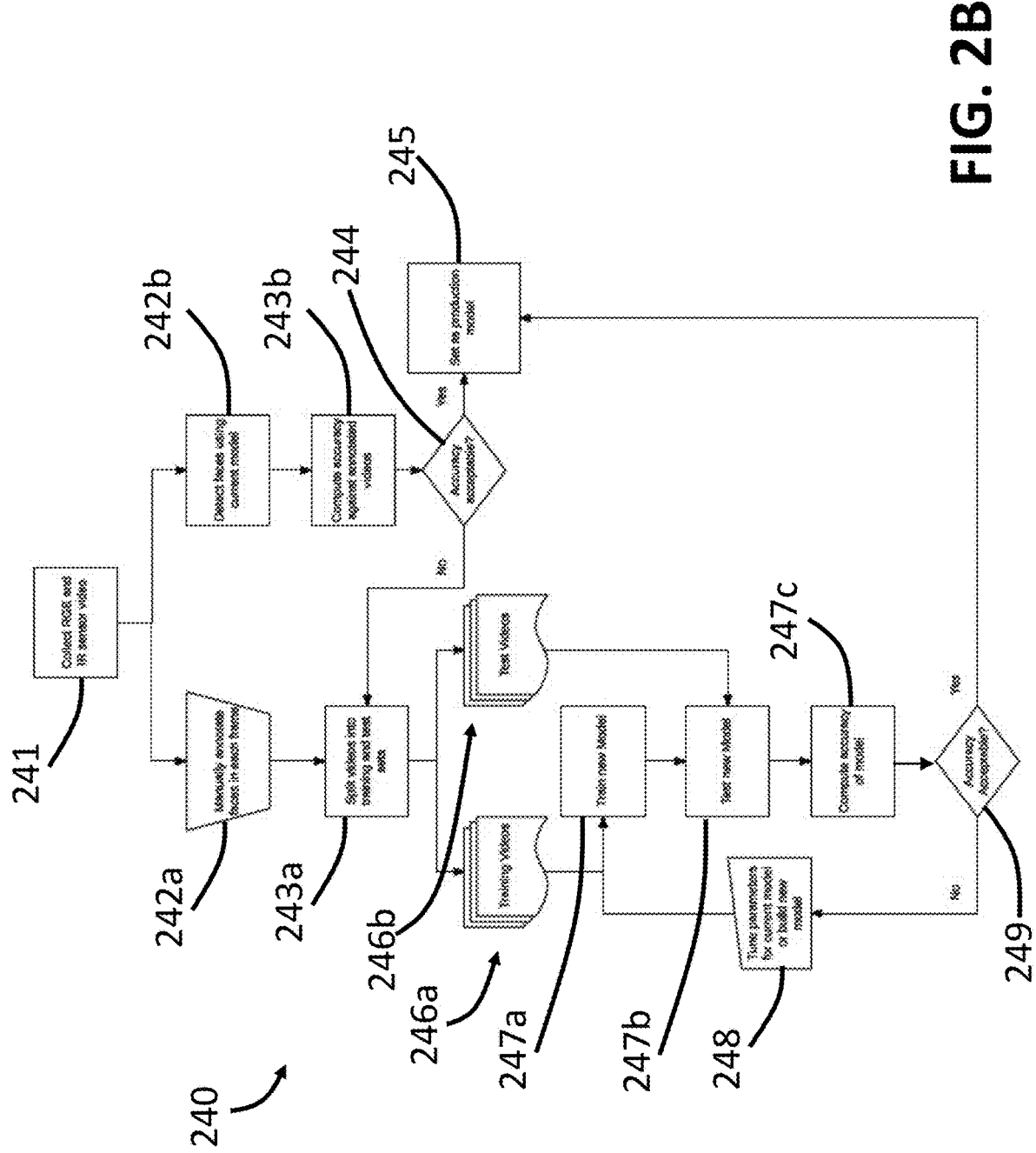
FIG. 2B illustrates a method of training a computer vision model for quantifying user engagement.

FIG. 2B illustrates a method of training a computer vision model for quantifying viewer engagement. At 241, both the RGB and IR sensors acquire video data, which undergoes two types of processing. At 242*a*, the video data is manually annotated to identify faces in each frame. At 242*b*, a current model (e.g., a default model or a model from previous use) is sued to automatically detect faces in each frame. At 243*b*, a processor is used to compute accuracy of the automatic detection at 242*b* against the annotated videos acquired at 242*a*. At 244, if the accuracy is acceptable, the method 240 proceeds to 245, where the current model is set as the production model for facial recognition (e.g., used in the method 200). If the accuracy is not acceptable, the method 200 proceeds to 243*a*, where the videos are split into a training set of videos (246*a*) and a test set of videos (246*b*). For example, the RGB videos can be selected as the training videos 246*a* and the IR videos can be selected as the test videos 246*b* (or vice versa).

The training videos 246*a* are sent to train a new model at 247*a*, while the test videos (246*b*) are sent to step 247*b* for testing the new model. At 247*b*, the training videos 246*a* and the test videos 246*b* are collected together so as to compute accuracy of the new model at 247*c*. At 249, the processor again computes the accuracy of the new model. If the accuracy is acceptable, the new model is set as the production model (245). If not, the method 240 proceeds to 248, where parameters of the new model are tuned. Alternatively, another new model can be built at 248. In any event, parameters of the new model are sent back to 247*a*, where the training videos 246*a* are used to training the new model. In this manner, a new model can be iteratively built to have an acceptable accuracy.

Remote Server Operation

In operation, the remote server 170 collects data transmitted from different local devices 105 disposed in different households. The remote server 170 can read the incoming data on a regular basis. The remote server 170 can also parse the received data and join the video recognition data with the audio recognition data using the timestamps of when each was saved.

The remote server 170 can also correct mislabeled data. For example, the remote server 170 can fix blips when a viewer is not identified or is misidentified using data from preceding and following timestamps. If a person is identified in an image preceding the image at issue and also in an image following the image at issue, the remote server 170 can determine that this person also appears in the image at issue.

The remote server 170 can also load data received from local devices 105 and/or data processed by the remote server 170 into a query-able database. In one example, the remote server 170 can also provide access to users, who can then use the stored data for analysis. In another example, the stored data in the query-able database can also facilitate further analysis performed by the remote server 170. For example, the remote server 170 can calculate attention index and viewer index using the database.

Assessing Viewer Engagement

FIGS. 3A-6 illustrate methods of quantifying viewer engagement with videos using measures such as viewability index and attention index. The following definitions may be helpful in understanding the inventive methods and apparatus for quantifying viewer engagement with videos:

Program Duration is defined as the total duration of a unique program, e.g., in seconds, minutes, or hours. The actual unit (seconds, minutes, or hours) used is immaterial as long as the durations of different programs can be compared.

Commercial Duration is defined as the total duration (e.g., in seconds or minutes) of a unique commercial.

Watching Duration (Seconds) is defined as the total duration (number of seconds) that are watched of a unique program or commercial per home. Alternatively, Watching Seconds can be defined as the total duration of program in seconds minus the total time (in seconds) during which no home watches the program.

Aggregated Watching Duration (Seconds) is defined as the total duration (number of seconds) that are watched of a unique program or commercial across all homes.

Positive Duration Ratio is defined as the percentage (%) of a program or commercial advertise that has been watched. More specifically, the Positive Duration Ratio of a program or advertisement can be calculated as the ratio of the Aggregated Watching Duration over total duration of the program or advertisement times the number of households.

Viewer Count (VC) is defined as the total number of viewers in the viewing area across all homes with positive Watching Seconds for a given program or commercial advertisement.

Watching Rate (WR) is defined as the ratio of the total number of people across all homes where the TV is on over the total number of people in all households. For example, if the methods take into account 100 households having a total number of 300 people. If 30 households having 100 people have their TV set on, the watching rate is then 33.3% (i.e., 100/300). However, if the same 30 households have 150 people, then the watching rate is 50% (i.e., 150/300).

Viewing Rate (VR) is defined as the ratio of the total number of people in the viewing area across all homes over the total number of TV sets that are on. For example, if 100 people are in the viewing areas defined by 40 different TV sets (each TV set defines one viewing area), then the viewing rate is 2.5 (i.e., 100/40).

Attention Rate (AR) is defined as the ratio of the total number of people attentive to the TV across all homes over the total number of people in the viewing area across all homes. For example, if 100 people are in the viewing areas across all individuals taken into account by the methods, but only 60 people are actually watching TV (the rest 40 people may just leave the TV on while doing other things), then the attention rate is 0.6 or 60%.

Viewability Index (VI) is defined as the average of Viewing Rates (VRs) for each program and commercial.

Attention Index is defined as the average of Attention Rates (ARs) for each program and commercial.

FIG. 3A illustrates a method 300 of assessing viewer engagement (e.g., box 206 in the method 200 of FIG. 2A) including facial and eyeball tracking 310, facial recognition 320, and sentimental analysis 330. A processor (e.g., the local processor 150 shown in FIG. 1) can be used to implement the method 300. The input data in method 300 can be the data acquired by the local device 105 shown in FIG. 1, such as the image data, audio data, or depth data of the viewing area. Face and eyeball tracking 310 is employed to identify characteristic data points to track the face as it moves and determine if user is watching screen. Facial recognition 320 is employed to determine a viewer's identity using, for example, artificial intelligence. Sentimental analysis 330 is employed to determine a viewer's emotion using, for example, artificial intelligence to analyze facial features, gestures, and heart rate, among others.

The acquired information, including whether a viewer is in fact watching the screen, the identity of the viewer, and the emotion of the viewer, is used to determine various video ratings 340. In one example, the acquired information is used to estimate individual video rating for each household. In another example, the acquired information is used to estimate individual video rating for each demographic region. In yet another example, the acquired information is used to estimate overall video rating for a group of videos. In yet another example, the acquired information is used to estimate audience reactions to specific videos (e.g., programs and advertisements). The acquired information can also be used to determine quantitative measures of viewer engagement, such as viewability index and attention index as described below.

Steps 310, 320, and 330 in the method 300 can be achieved using pattern recognition techniques. These techniques can determine whether any viewer is present in the viewing area by, for example, recognizing one or more human faces. If there is indeed a face recognized, these techniques can further determine who the viewer is by, for example, comparing the recognized face with a database including the facial data of the household where the video is playing. Alternatively, these techniques may use extended database to include facial data of more people (e.g., the entire community if possible) in case the viewer is not from the household. These techniques can also trace the movement of the face and analyze the orientation of the face so as to determine, for example, whether the viewer is watching the videos.

Artificial intelligence, machining learning, and trained neural network learning techniques can also be used to analyze the emotion of the viewer. To this end, these techniques analyze the body gestures (static gestures at certain time), body movements (change of gestures), facial orientations, direction/movement/positioning of faces, and heart rate, among others.

In another example, the method 300 can first recognize a face from image data acquired by, for example, the RGB sensor 140 and IR sensor 120 shown in FIG. 1. The method 200 can also detect the position of the face, identify characteristic points on the face (e.g., boundaries points of eyes and mouth as shown in FIG. 2A), and track the face as it moves. Using eyeball tracking techniques, the method 300 can determine whether the view is actually watching the videos (or instead just sitting in the viewing area but doing something else). Then, using techniques of trained neural network learning, the method 300 can match the viewer with a known person in the household by comparing facial features from the database in a similar position. Once the viewer has been identified, the method 300 can continually track the viewer for notable facial configurations to determine the user's mood and/or emotion.

The method 300 can also compare the audio data (e.g., acquired by the microphone 140 shown in FIG. 1) with an audio database of videos (e.g., TV shows) and other audio so as to determinate which video is being played at a specific timing point. In one example, the video matching can determine which TV station is being viewed by the viewer(s) identified by the method 300. In another example, the video matching can determine which TV program is being viewed by the viewer. In yet another example, the video matching can determine which commercial advertisement is being viewed. Alternatively, or additionally, the TV channel, program, or advertisement that is being viewed can be determined from data collected from other sources, including, but are not limited to, a cable or satellite set top box or other programming provider's hardware or broadcast signal.

Figure 3B:
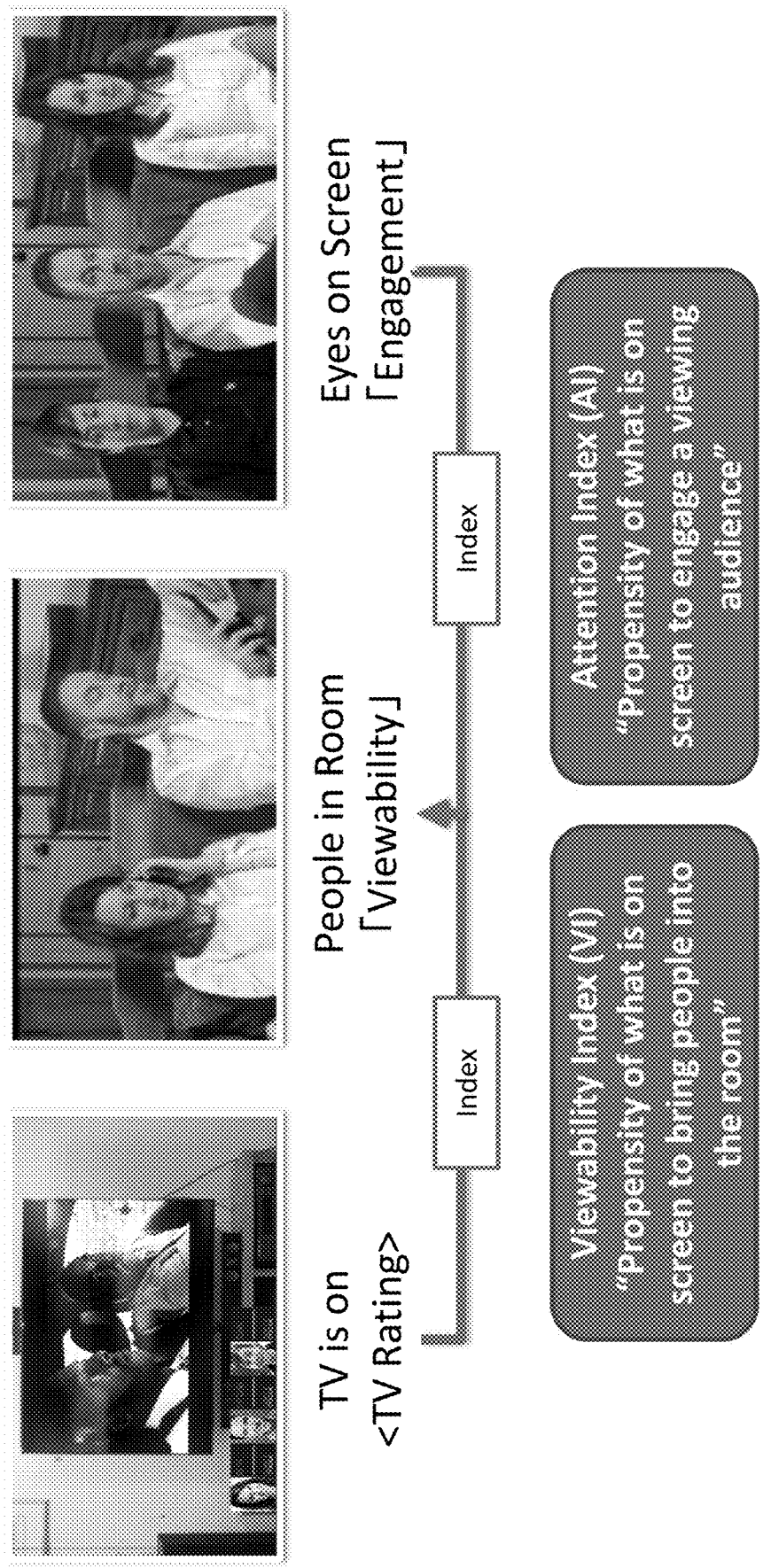
FIG. 3B illustrates the concepts of viewability index and attention index.

FIG. 3B illustrates the concepts of viewability index and attention index that can be estimated via techniques described herein to quantify viewer engagement. In general, viewability index quantifies the propensity of what is on screen to bring people into the room. Attention index quantifies the propensity of what is on screen to engage a viewing audience. In other words, the viewability index can be regarded as the probability of a video (or other displayed content) to attract a viewer in the first place, while the attention index can be regarded as the probability of a video to keep a viewer in front of the display after the viewer is already in the viewing area. As illustrated in FIG. 3B, the viewability index is dependent on the number of people present in the viewing area, while the attention index is dependent on the number people who are actually watching the display.

Assessing Viewer Engagement with a Viewability Index and an Attention Index

Figure 4A:
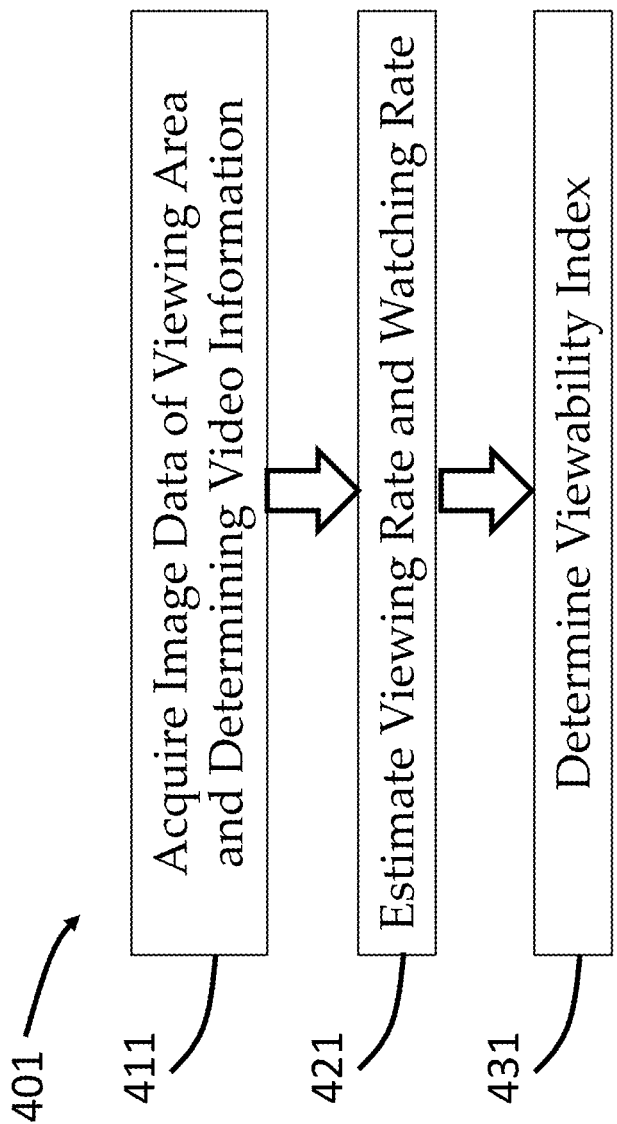
FIG. 4A illustrates a process for assessing viewer engagement including estimating viewability index.

FIG. 4A illustrates a method 401 of quantifying viewer engagement using viewability index. The method 401 can be implemented by a processor. The method 401 starts at step 411, in which image data in acquired by the processor at each household in a plurality of households, which participate in the method via, for example, installing or using the local device 105 in the system shown in FIG. 1. The image data includes images of a viewing area in front of a display which can play videos (e.g., TV programs, advertisement, user-request video, or any other video). In addition, the processor also determines if the display is showing a video at step 411. At step 421, the processor estimates the viewing rate and watching rate for each video that is played by the display. The viewing rate represents a ratio of a total number of people in the viewing areas to a total number of displays showing videos, as defined above. Similarly, the watching rate represents a ratio of total number of people in households with display showing videos to a total number of people in the plurality of households, as defined above.

The estimation of the viewing rates and the watching rates is based on the image data acquired at step 411 and on demographic information about each household in the plurality of households. The demographic information can be stored in a memory operably coupled to the processor such that the processor can readily retrieve the demographic information. In another example, the processor can acquire the demographic information from another server. At step 330, the processor determines a viewability index based on the viewing rate and the watching rate, for each unique video in the plurality of videos. The viewability index is defined above as an average of viewing rate for each video, such as a program and a commercial.

The method 401 can further include estimating the viewer count and the positive duration ratio of each video played by the display. The estimation is based on the image data and on demographic information about each household in the plurality of households. As defined above, the viewer count represents a total number of people engaged with each unique video, and the positive duration ratio represents a ratio of total time spent by people in the plurality of households watching the unique video to a duration of the unique video.

Based on the viewer count and the position duration ratio, a balanced viewability index can be determined. In one example, the balanced viewability index can be calculated as the weighted average of viewability index (VI) by factoring in the viewer count and positive duration Ratio for each given program and commercial. In another example, the balanced viewability index can be calculated by normalizing the viewability index across the unique videos in the plurality of videos.

The method 401 can further include averaging the viewability index across all programs and commercials for a finite period of time so as to produce an average viewability index. The viewability index of each program and commercial can be divided by the average viewability index (e.g., computed on a daily, weekly, or monthly basis) so as to produce a final viewability index (dimensionless quantity) for users, such as advertising agencies, TV stations, or other content providers. In one example, the finite period of time is about two weeks. In another example, the finite period of time is about one month. In yet another example, the finite period of time is about three months.

The image data can be acquired at various acquisition rates. In one example, the image data can be taken 50 times per second (50 Hz). In one example, the image data can be taken 30 times per second (30 Hz). In yet another example, the image data can be taken every second (1 Hz). In yet another example, the image data can be taken every 2 seconds (0.5 Hz). In yet another example, the image data can be taken every 5 seconds (0.2 Hz). In addition, the method 300 can take and categorize image data for each viewer in the viewing area so as to derive viewer engagement information taking into account demographic information of the household.

Figure 4B:
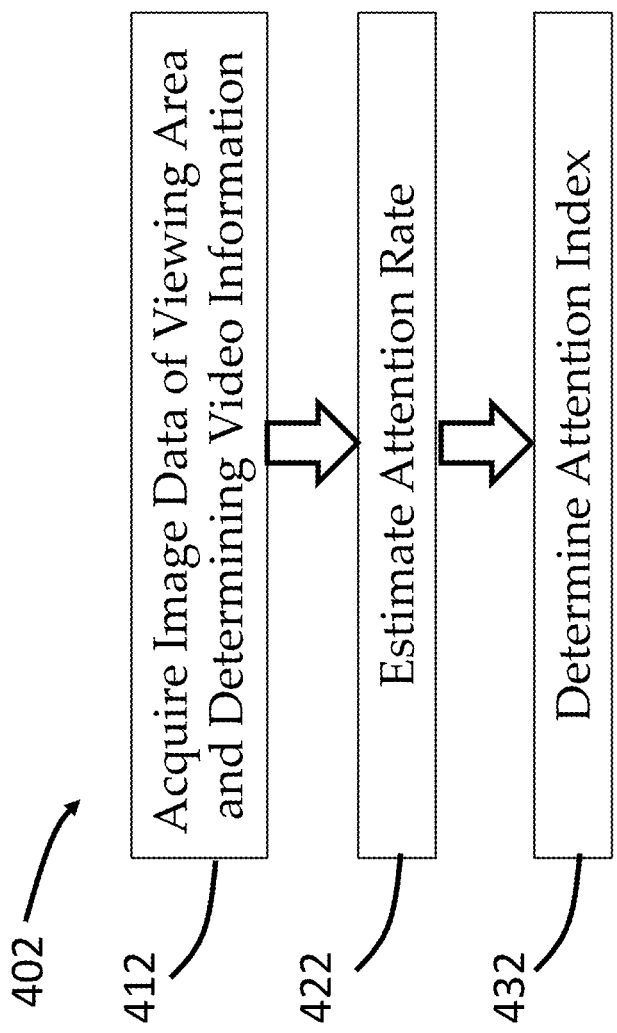
FIG. 4B illustrates a process for assessing viewer engagement including estimating attention index.

FIG. 4B illustrates a method 402 of quantifying user engagement with videos using attention index. The method 402 includes step 412, at which image data of a viewing area in front of a display is taken for each household participating in the viewer engagement assessment. At step 412, a processor determines whether the display is showing any video when the image data is taken (e.g., via audio data acquired by the microphone 140 in the local device 105 shown in FIG. 1). At step 422, for each video played by the display, the processor estimates an attention rate based on the image data and on demographic information about the household. As defined above, the attention rate represents a ratio of a total number of people engaged with the video to a total number of people in the viewing areas. Based on the attention rates of videos, an attention index is determined at step 432 to indicate the effectiveness of the video.

The method 402 can further include estimating viewer count and positive duration ratio of the video(s) played by the display. Similar to the method 401, the method 402 can determine the viewer count and positive duration ration based on the image data and on demographic information about each household. Using the viewer count and positive duration ration, the processor can then determine a balanced attention index. The method 402 can include producing a normalized attention index by normalizing the attention index across the unique videos in the plurality of videos over a given period of time (e.g., one week, or one month).

The method 402 can further include averaging attention index across all programs and commercials for a finite period of time so as to produce an average attention index. The attention index of each program and commercial can be divided by the average attention index so as to produce a final attention index (dimensionless quantity) for customers, such as advertising agencies, TV stations, or other content providers.

Assessing Viewer Engagement Using Facial Recognition Techniques

FIG. 5 illustrates a method of assessing viewer engagement with videos using facial recognition techniques and other artificial intelligence techniques. The method 500 starts at step 510 where images of a viewing area in front of a display are captured (e.g., using the system shown in FIG. 1). For each acquired image, the number of people in the viewing area is estimated at step 520. In one example, the estimation can be performed using, for example, facial recognition techniques. In another example, the estimation can be performed based on body skeleton detection.

At step 530, with respect to the display, the orientation of the face of each person in the viewing area is determined. For example, the orientation of the face can be toward the display, indicating that the viewer is actually watching the videos on the display. Alternatively, the orientation of the face can be away from the display, indicating that the viewer is not watching the video, although he or she is within the viewing area of the display. Therefore, based on the orientation of the viewers' faces, a processor can assess whether each person in the viewing area is actually engaged with the video, at step 540. By distinguishing people actually watching the videos from those who are not watching, the processor can make more accurately determination of the effectiveness of the video. The effectiveness of the video can be quantified by, for example, how long the video can keep the viewer in an engaged state.

Detecting Skeleton, Face, Identification, Emotion, and Engagement

Figure 6:
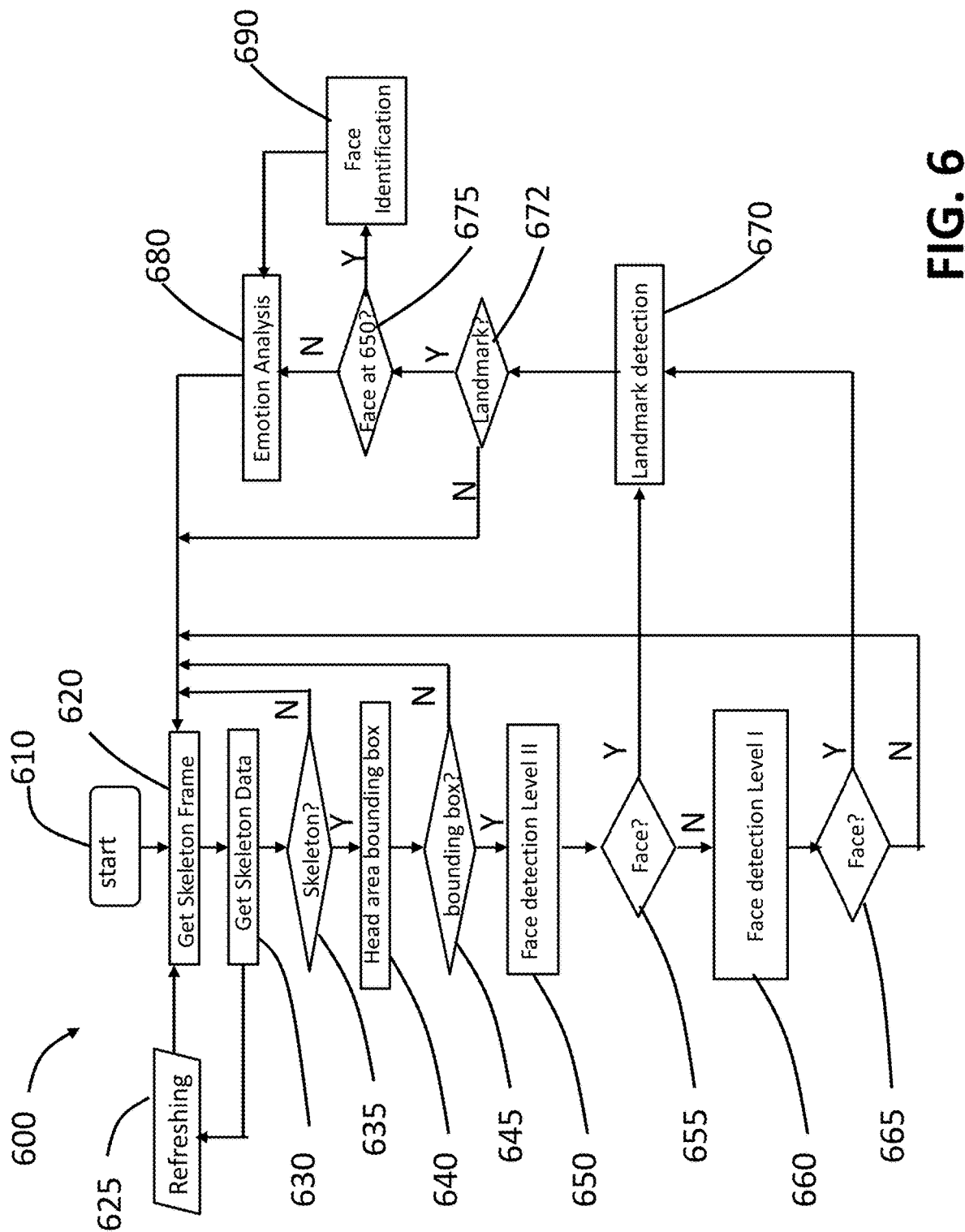
FIG. 6 illustrates a process for detecting skeleton, face, identification, emotion, and engagement.

FIG. 6 is a flowchart illustrating a method 600 to detect skeleton, face, identification, emotion, and engagement, which in turn can be used for viewer engagement assessment described above. The method 600 can be implemented by a processor (e.g., the processor 150 or the processor in the remote server 170). The method 600 starts at step 610, where image data of a viewing area in front of a display is provided (e.g., by a memory or directly from the image taking device, such as the RGB sensor 130 shown in FIG. 1). At step 620, the processor acquires a skeleton frame (i.e., an image frame including image of at least one possible viewer, see, e.g., 230 in FIG. 2A) from the image data. At step 630, a processing loop is initiated, where the processor uses six individual skeleton data points/sets for each skeleton frame for further processing, including facial recognition, emotion analysis, and engagement determination. Once the skeleton data has been processed, the method 600 returns to skeleton frame acquisition at step 620 via a refreshing step 625.

Step 635 in the method 600 is a decision step, at which the processor determines whether any skeleton is detected in the selected skeleton data in the skeleton frame. If not, the method 600 returns to step 630, where a new skeleton data is picked up for processing. If at least one skeleton is detected, the method 600 proceeds to step 640, where a bounding box is generated to identify head area of viewers in the image data. The bounding box can be generated based on, for example, the skeleton information, e.g., by identifying the head from the overall skeleton.

Step 645 again is a decision step, where the processor determines whether a bounding box is generated (i.e., whether a head area is detected). It is possible that an image includes an overall skeleton of a viewer but the head part of the viewer is obstructed and therefore is absent from the image. In this case, the method 600 again returns to step 630, where the processor picked up new skeleton data. If a bounding box is detected, the method 600 goes to step 650, where the processor carries out a second level facial recognition (also referred to as face detection). At this step, the processor attempts to detect human face within the bounding box generated at step 640. The face detection can be performed using, for example, Haar Feature-based Cascade Classifier in OpenCV. More information can be found in U.S. Pat. No. 8,447,139 B2, which is incorporated herein by reference in its entirety.

At step 655, the processor determines whether a face is detected at step 650. If not, a first level facial recognition is performed at step 660. This first level facial recognition step can be substantially similar to the second level facial recognition performed at step 650. Performing another round of face detection may reduce the possibility of accidental failure of the facial recognition techniques. Step 665 is a decision step similar to step 655, where the processor determines whether a face is detected.

If a face is detected at either first level facial recognition or second level facial recognition, the method 600 proceeds to step 670 to perform facial landmark detection, also referred to as facial feature detection or facial key points detection. The step 670 is employed to determine locations of different facial features (e.g. corners of the eyes, eyebrows, and the mouth, the tip of the nose, etc.). More information of facial landmark detection can be found in U.S. Patent Publication No. 2014/0050358 A1 and U.S. Pat. No. 7,751,599 B2, which are incorporated herein in their entireties.

At step 672, the processor determines whether any facial landmark is detected at step 670. If not, the method 600 returns to step 630 to select another skeleton data for further processing. If at least one facial landmark is detected, the processor further determines, at a decision step 674, whether any face is detected at the second level facial recognition in step 650. If yes, the method 600 proceeds to step 690, where the detected face is identified (i.e., determining who the viewer is), after which the method goes to step 680, where emotion of the face based on the facial landmark is predicted. If, at step 674, the processor finds that no face was detected at step 650, the method 600 directly proceeds to step 680 for the processor to estimate emotion of the viewer. Emotion analysis can be performed using, for example, a Support Vector Machine (SVM) in Open CV. More information can be found in U.S. Pat. No. 8,488,023, which is incorporated herein in its entirety.

In one example, the methods illustrated in FIGS. 3-6 analyze all available videos (including TV programs and advertisement) regardless of the duration of the video or viewer count of the video. In another example, the methods illustrated in FIGS. 3-6 perform preliminary filtering to exclude videos that are either too short or have too small a viewer count before performing the quantitative analysis of viewer engagement. In this way, the quantitative analysis can result in more statistically reliable results. For example, videos that are watched for less than a finite amount of time (e.g., less than 30 seconds, less than 20 seconds, or less than 10 seconds) can be excluded. In addition, videos that are watched by less than certain number of people (e.g., less than 20 people, less than 15 people, or less than 10 people) over a finite period (e.g., 1 month, two weeks, or one week) can also be excluded.

In one example, the methods illustrated in FIGS. 3-6 are performed over live TV programs. In another example, the methods illustrated in FIGS. 3-6 are performed over recorded TV programs. If it is recognized that the timing of a program is greater than 10 minutes shifted from its original "finger creation timestamp" (e.g., from database of TV stations), the program is determined as recorded watching. Otherwise, the program is determined as live watching.

Experimental Assessment of the Commercial Message (CM) Effect

This section describes accurate viewing data collection and analysis to examine commercial message (CM) effect management. An index termed "viewability" indicates when a person is "in front of the TV". The viewability index is created for this description and the survey that generates the data. The survey conducted for two weeks with a sample of 84 people from 30 households. CM curves are defined as patterns that show the time series curves of viewability rates between two scenes. Although the personal viewing rate of CM between scenes can be constant, the viewability rate may change. The findings show that there are 7 patterns of the CM curve. The variables of the length of CM and viewability rate can significantly contribute to the shape of the CM curve. In addition, multinomial logit model can be help in determining the CM curve.

This experiment investigated the relationship between commercial messages (CM), programs, and human viewing attitudes. The experiment also characterized the systems and methods described above. The correlation between program information, such as broadcast timing and TV stations, and viewing attitudes using statistical methods were analyzed. Currently, the personal audience rating survey used in Japan registers people through a colored button on the TV remote control and records when they press the colored button at the start and end of TV viewing. Further, the People Meter (PM) indicator records what the TV audience watched and who watched the programs (Video Research Ltd. (2014): "TV rating handbook", available at the VIDEOR.COM website in PDF format, incorporated herein by reference). However, this audience rating survey usually does not allow one to distinguish between focused and casual viewing even if the audience rating is accurately captured.

Hiraki and Ito (Hiraki, A. & Ito, K. (2000): Cognitive attitudes to television commercials based on eye tracking analysis combined with scenario, *Japanese Journal of Human Engineering*, Vol. 36, pp. 239-253, incorporated herein by reference) proposed a method for analyzing the impact of CM on image recognition using visual information based on eye movement analysis. They conducted CM viewing experiments with real CM in an environment of recreated viewing situations. According to them, auditory and visual information may interfere with commodity understanding.

In this experiment, besides personal audience ratings, an indicator of physical presence captured by the system was used to measure viewing attitudes. For example, during CM, people may leave their seats and turn their attention to one another without sitting in front of the TV. Thus, viewing attitudes during CM was statistically analyzed using two indexes-personal audience ratings and physical presence. The latter index is referred to herein as "viewability."

The viewing attitude survey experiment of 84 individuals from 30 households was conducted from mid-November to the end of November in 2014. Data was obtained 24 hours per day over 14 days.

Figure 7:
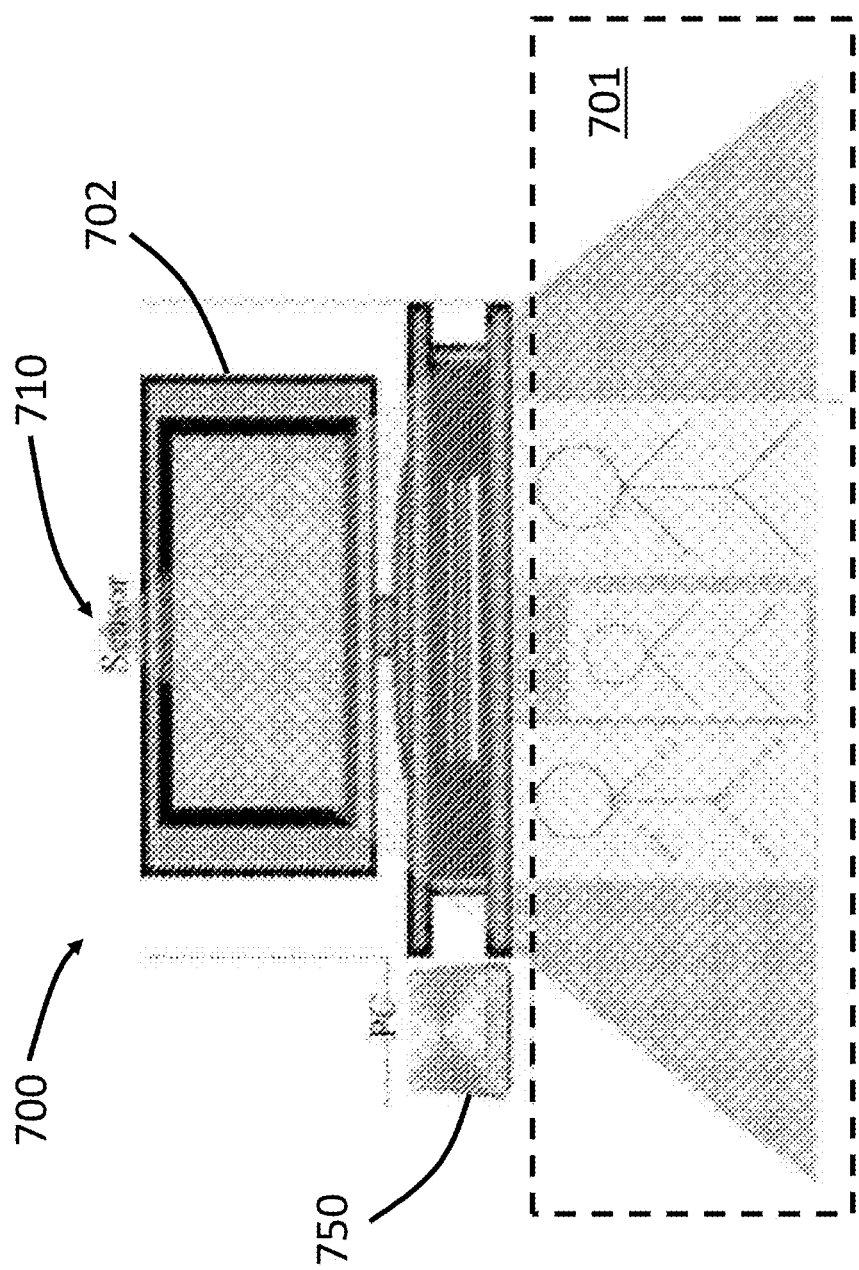
FIG. 7 shows a schematic view of a data acquisition architecture in exemplary methods of viewer engagement assessment.
Figure 8G:
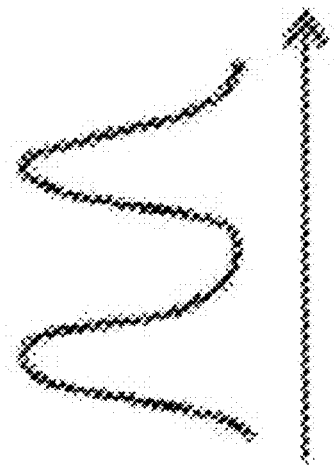
Figure 8F:
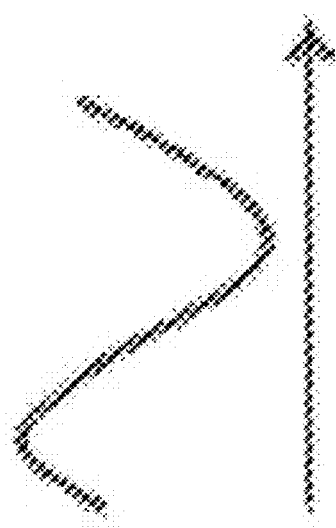

FIG. 7 shows a schematic view of a data acquisition system 700 that measures engagement of viewers in a viewing area 701 with a program or advertisement shown on a TV 702 or other display. The system 700 includes an image sensor 710 that captures images of the viewing area 701 while the TV 702 is on. The system 700 also includes a computing device 750 that stores and processes image data from the image sensor 710 and communicates the raw and/or processed image data to a server (not shown) via a communication network.

In some cases, the computing device 750 and/or the server measures viewability in addition to personal audience ratings. Viewability indicates "being in front of the TV," and this term is defined as the audience within a distance of about 0.5 m to about 4 m from the TV with the face towards the front of the TV between 70° to the left and the right. In one example, viewability is captured at the rate of 1 second, and it denotes the number of samples for one second divided by the all the samples (84 in this case).

FIGS. 8A-8G shows seven different shapes of CM curves, which denote the transition in the value of viewability divided by the personal audience rating. This value can indicate the percentage of people who are actually watching the TV.

date and day of the week. The previous scene refers to the scene between the CM and the previous CM.

The discrimination results based on the multinomial logit model are shown in TABLE 1. The discrimination rate in the multinomial logit model is 20% higher than the discrimination rate at random. The discrimination rate is particularly high when the shape of the CM curve is B or G.

In this model, seven explanatory variables are used: length of CM, TV stations, elapsed time since the start of the program, average personal audience rating for the CM, viewability rate, viewability rate of the CM divided by the personal audience rating, and viewability rate of the previous scene divided by the personal audience rating. Of the seven variables, length of CM and TV station contribute the most to the discrimination rate.

TABLE 1

| | Result of the multinomial logit model | | | | | | | |
|---|---|---|---|---|---|---|---|---|
| True/Prediction | A | B | C | D | E | F | G | Sum |
| A | 34 | 14 | 13 | 13 | 48 | 13 | 1 | 136 |
| B | 11 | 114 | 2 | 44 | 31 | 15 | 2 | 219 |
| c | 14 | 11 | 21 | 12 | 17 | 4 | 4 | 83 |
| D | 8 | 57 | 7 | 86 | 38 | 7 | 0 | 203 |
| E | 17 | 30 | 10 | 43 | 110 | 18 | 0 | 228 |
| F | 17 | 42 | — | 17 | 36 | 37 | 3 | 152 |
| G | 0 | 16 | 1 | 4 | 7 | 8 | 8 | 44 |
| Sum | 101 | 284 | 54 | 219 | 287 | 102 | 18 | 1065 |
| Discrimination Rate | 33.66 | 10.14 | 38.89 | 39.27 | 38.33 | 36.27 | 44.44 | 38.50 |

To explain the differences in the shape of CM curves, classification and modeling of the data can be performed. The methods of analysis employed in this experiment are discussed below. First, the multinomial logit model (see, e.g., Agresti, A. Categorical data analysis. John Wiley & Sons (2013), incorporated herein by reference) can be employed for data modeling. Then, non-hierarchical clustering can be performed using the K-means method, at least because the sample size (1,065) is large. Next, a decision tree can be constructed. Explanatory variables are used and all samples are classified using stepwise grouping. In general, the decision tree is a classification model that expresses the plurality of classification rules in a tree structure. The Gini coefficient was used as a non-purity function.

When determining the shape of the CM curve using these methods, the analysis also considers approaches or variables that are closely related to determining the shape of the CM curve. Thus, any variables that are observed substantially simultaneously with the CM broadcast can also be included.

Figure 9:
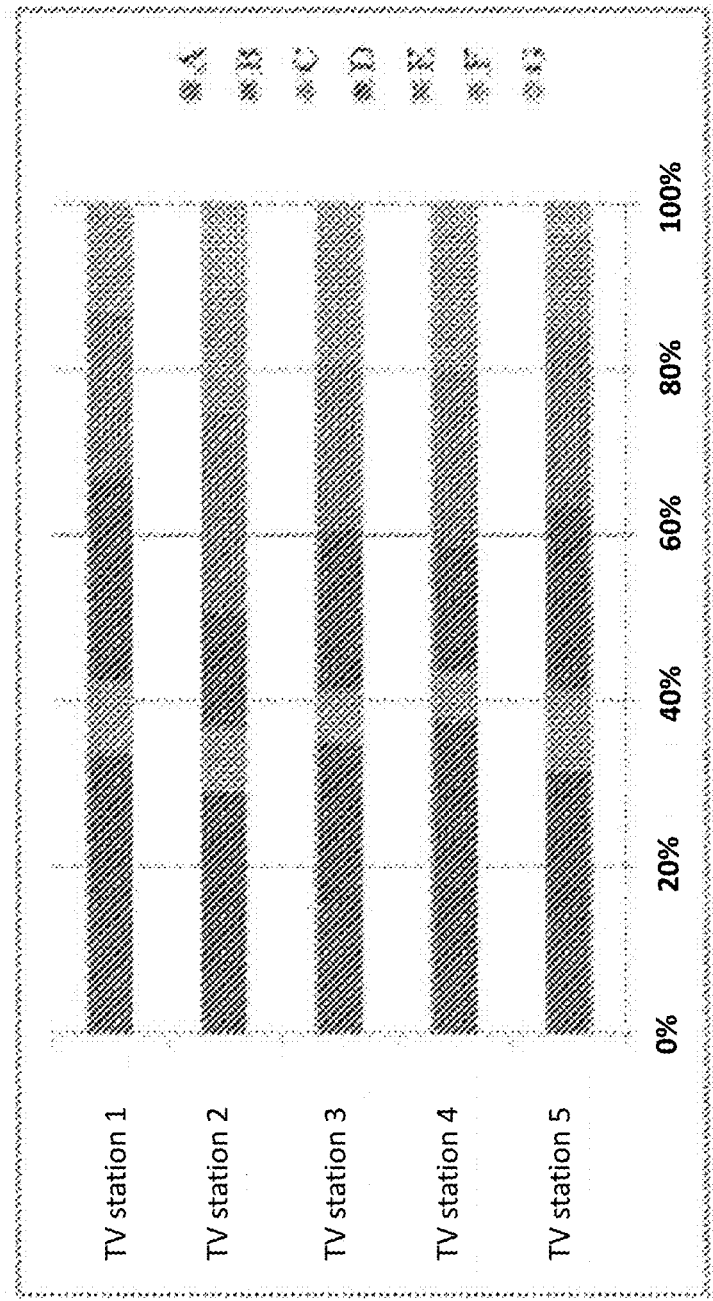
FIG. 9 shows the ratios of the CM curves for each of the sampled TV stations.

Data from a high viewability time range of the day is used, which, in this experiment, is six hours—from 18:00 to 24:00. The viewing attitudes towards CM from five TV stations are analyzed. The ratios of the CM curves for every TV station are shown in FIG. 9.

In the analysis, the shape of the CM curve is the dependent variable, and it is categorized from A to G, as shown in FIGS. 8A-8G. The explanatory variables are length of CM, television station, genre, elapsed time since the start of the program, average personal audience rating for the CM, average viewability rate of the CM, average personal audience rating for the previous scene, average viewability of the previous scene, viewability rate of the current scene divided by the personal audience rating, viewability rate of the previous scene divided by the personal audience rating, and The explained variables of the seven shapes can also be stratified. Although several different kinds of stratifications can be considered, for efficient examination, the following two kinds of stratifications were compared.

Stratification 1: Monotonic shape types (C/D/E) and non-monotonic shape types (A/B/F/G). First, monotonic shape types that do not have extreme values and non-monotonic shape types that do have extreme values were stratified. The multinomial logit model to each group is applied, and then the discrimination rate for each group can be calculated. The discrimination results of stratification 1 are shown in TABLE 2. The discrimination rate of the monotonic shape type is 59.34%, while that of the monotonic shape type is 51.72%, and the overall discrimination rate is 53.62%.

After stratifying the monotonic and non-monotonic shape types, the overall discrimination rate is 15% higher than that in the multinomial logit model without stratification. Compared to the multinomial logit model without stratification, the difference in the discrimination rates between the shapes of the CM curve could be determined correctly (D/E/G) and incorrectly (C).

The selected explanatory variables are as follows. In the monotonic shape types, six variables are selected, namely, TV station, elapsed time since the start of the program, average personal audience rating for the CM, viewability of the CM, viewability of the previous scene, and viewability of the previous scene divided by the personal audience rating. In the non-monotonic shape types, the six variables selected are length of CM, TV stations, elapsed time since the start of the program, average personal audience rating for the CM, viewability rate of the CM, and viewability rate of the previous scene. Length of CM, which contributes to the multinomial logit model without stratification, is not selected in the monotonic shape types.

TABLE 2

Discrimination results of stratification 1

| True/Prediction | A | B | C | D | E | F | G | Sum |
|---|---|---|---|---|---|---|---|---|
| A | 67 | 42 | 0 | 0 | 0 | 26 | I | 136 |
| B | 26 | 169 | 0 | 0 | 0 | 24 | 0 | 219 |
| C | 0 | 0 | IS | 25 | 43 | 0 | 0 | 83 |
| D | 0 | 0 | 10 | 139 | 54 | 0 | 0 | 203 |
| E | 0 | 0 | 14 | 63 | 151 | 0 | 0 | 228 |
| F | 30 | 75 | 0 | 0 | 0 | 26 | 4 | 152 |
| G | 4 | 22 | 0 | 0 | 0 | 14 | 4 | 44 |
| Sum | 127 | 308 | 39 | 227 | 248 | 90 | 6 | 1065 |
| Discrimination Rate | 52.76 | 54.87 | 38.46 | 61.23 | 60.89 | 28.89 | 66.67 | 53.62 |

Stratification 2: Simple shape types (A/B/C/D/E) and complicated shape types (F/G). Second, simple shape types can be stratified, which have at most one extreme value, and complicated shape types, which have more than one extreme value. The discrimination results of stratification 2 are shown in TABLE 3. The discrimination rate of the simple shape type is 46.50%, while that of the complicated shape type is 77.55%, and the overall discrimination rate is 52.21%.

For the simple shape types, nine variables are selected-length of CM, TV station, elapsed time since the start of the program, average personal audience rating for the CM, viewability rate of the CM, average personal audience rating of the previous scene, viewability rate divided by the personal audience rating of the CM, viewability of the previous scene divided by the average personal audience rating, and date. Further, for the complicated shape types, only one variable is selected-TV stations. As this model has only one variable, all samples are classified under F. For the simple shape types, the selected variables are similar to that of the multinomial logit model without stratification.

TABLE 3

Discrimination results of stratification 2

| True/Prediction | A | B | C | D | E | F | G | Sum |
|---|---|---|---|---|---|---|---|---|
| A | 39 | 19 | 13 | 20 | 45 | 0 | 0 | 136 |
| B | 15 | 121 | 2 | 46 | 35 | 0 | 0 | 219 |
| C | 12 | 15 | 23 | 12 | 21 | 0 | 0 | 83 |
| D | 11 | so | 7 | 103 | 32 | 0 | 0 | 203 |
| E | 22 | 38 | 10 | 40 | 118 | 0 | 0 | 228 |
| F | 0 | 0 | 0 | 0 | 0 | 152 | 0 | 152 |
| G | 0 | 0 | 0 | 0 | 0 | 44 | 0 | 44 |
| Sum | 99 | 243 | 55 | 221 | 251 | 196 | 0 | 1065 |
| Discrimination Rate | 39.39 | 49.79 | 41.82 | 46.61 | 47.01 | 77.55 | 0.00 | 52.21 |

Cluster analysis using the explanatory variables can be performed. The discrimination results of the cluster analysis are shown in TABLE 4. The discrimination rate is 15.77%, and there is no difference in the discrimination rate between cluster analysis and random selection. In other words, in the nonhierarchical cluster analysis, the CM curve could not be classified.

TABLE 4

Discrimination results of cluster analysis

| True/Prediction | A | B | C | D | E | F | G | Sum |
|---|---|---|---|---|---|---|---|---|
| A | 10 | 21 | 10 | 14 | 58 | 14 | 9 | 136 |
| B | 22 | 25 | 19 | 11 | 116 | 16 | 10 | 219 |
| C | 6 | 10 | 4 | 11 | 38 | 10 | 4 | 83 |
| D | 17 | 28 | 6 | 10 | 110 | 25 | 7 | 203 |
| E | 32 | 29 | 10 | 13 | 109 | 28 | 7 | 228 |
| F | 11 | 29 | 7 | 16 | 76 | 9 | 4 | 152 |
| G | 4 | 7 | 2 | 3 | 26 | 1 | 1 | 44 |
| Sum | 102 | 149 | 58 | 78 | 533 | 103 | 42 | 1065 |
| Discrimination Rate | 9.80 | 16.78 | 6.90 | 12.82 | 20.45 | 8.74 | 2.38 | 15.77 |

Figure 10:
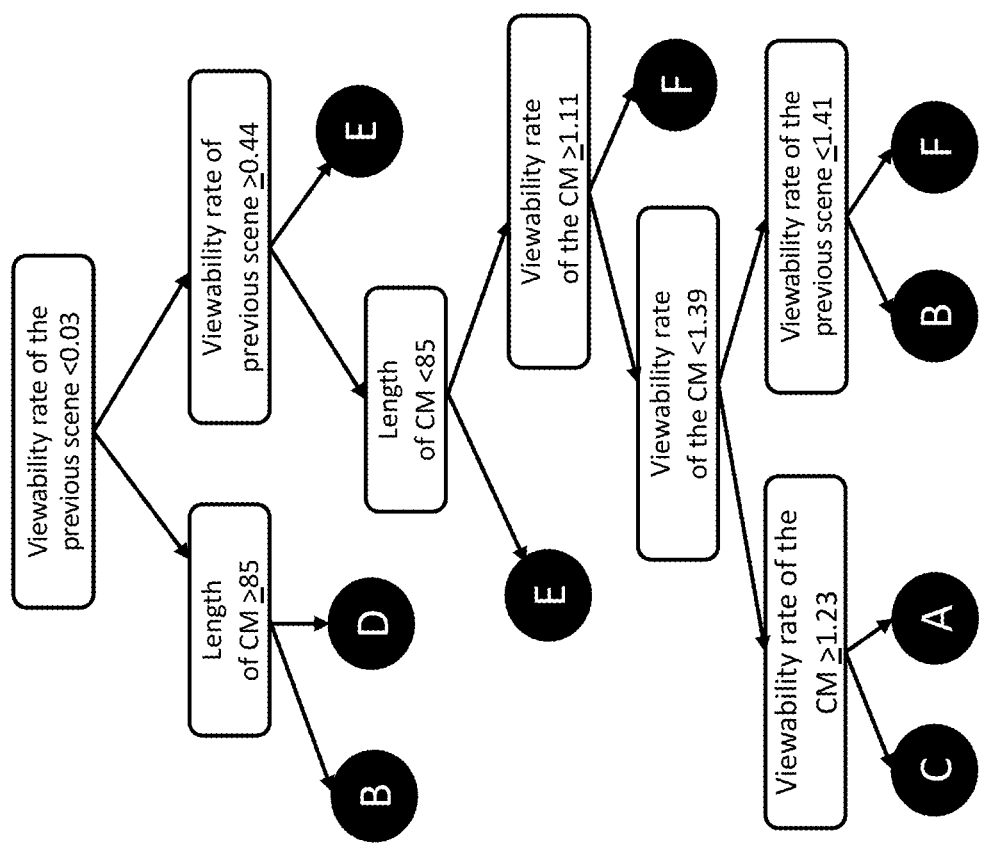
FIG. 10 shows a classification model through a decision tree with the determination results of the decision tree shown in TABLE 5.

FIG. 10 shows a classification model through a decision tree. The determination results of the decision tree are shown in TABLE 5. The discrimination rate of the decision tree is 40%. From TABLE 5, one can see that the discrimination rate of G is 0%, but that of D is higher than that of other CM curves by as much as 73%. The discrimination rate of the decision tree is slightly higher than that of the multinomial logit model without stratification.

From FIG. 10, the characteristics of each shape of the CM curve can be identified. Shape A occurs when the viewability rate is high. Shape B occurs when the viewability rate is low and the length of CM is long. Shape C occurs when the viewability rate of a scene is not very different from that of the previous scene. Shape D occurs when the viewability rate is low and the length of CM is short. Shape E occurs when the viewability rate of the previous scene is low and the length of CM is short. Shape F occurs when the viewability rate of a scene is low while the viewability rate of the previous scene is high.

TABLE 5

Discriminant results of the decision tree

| True/Prediction | A | B | C | D | E | F | G | Sum |
|---|---|---|---|---|---|---|---|---|
| A | 17 | 10 | 14 | 0 | 32 | 63 | 0 | 136 |
| B | 4 | 121 | 5 | 8 | 46 | 35 | 0 | 219 |
| C | 5 | 3 | 31 | 1 | 34 | 9 | 0 | 83 |
| D | 6 | 70 | 4 | 30 | 68 | 25 | 0 | 203 |
| E | 5 | 17 | 8 | 2 | 128 | 68 | 0 | 228 |
| F | 6 | 29 | 2 | 0 | 16 | 99 | 0 | 152 |
| G | 2 | 11 | 2 | 0 | 7 | 22 | 0 | 44 |
| Sum | 45 | 261 | 66 | 41 | 331 | 321 | 0 | 1065 |
| Discrimination Rate | 37.78 | 46.36 | 46.97 | 73.17 | 38.67 | 30.84 | 0.00 | 40 |

Comparison and consideration. The discrimination rate by each method is summarized in TABLE 6. The method of stratification 1 has the highest rate among all methods. However, since the explained variables were stratified, it is impossible to verify the entire connection.

TABLE 6

Summary of discrimination rates

| Multiple Logit | Stratification1 | Stratification2 | Cluster Analysis | Decision Tree |
|---|---|---|---|---|
| 38.5 | 53.62 | 52.21 | 15.77 | 40 |

The discrimination rate of the multinomial logit model without stratification is almost the same as the rate of the decision tree. Because the decision tree is determined by whether or not the viewability rate is higher than a fixed value, it is difficult to understand intuitively, and the fixed value is not replicable. Therefore, the most suitable method to determine the CM curve is the multinomial logit model without stratification.

In all the methods, the variables of length of CM and viewability rate contribute the most to determining the CM curve. Therefore, TV viewing attitudes do not depend on the genre and broadcast time of the program, but on the length of CM and the viewability rate of the current and previous scenes.

In these five methods, the variables of length of CM and viewability rate greatly contribute to determining the CM curve. In this regard, two points are considered: 1) the relationship between the length of CM and viewability rate, and 2) in what kinds of situations the viewability rate is high.

Figure 11:
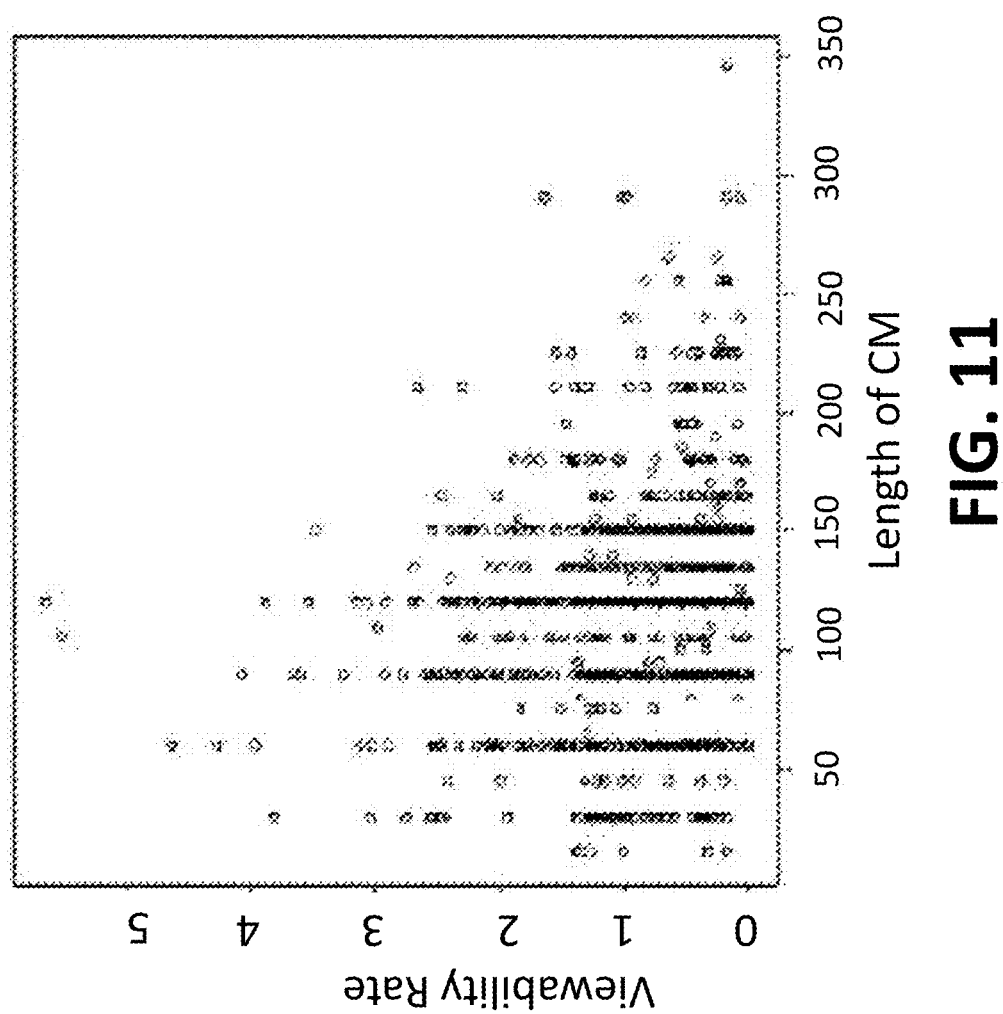
FIG. 11 illustrates the viewability rate with respect to the length of the CM.

The relationship between the length of CM and viewability rate is illustrated in FIG. 11. In general, the shorter the length of CM, the higher the viewability rate is. The longer the CM, the lower the viewability rate, because people will become uninterested and stop looking at the TV.

Figure 12:
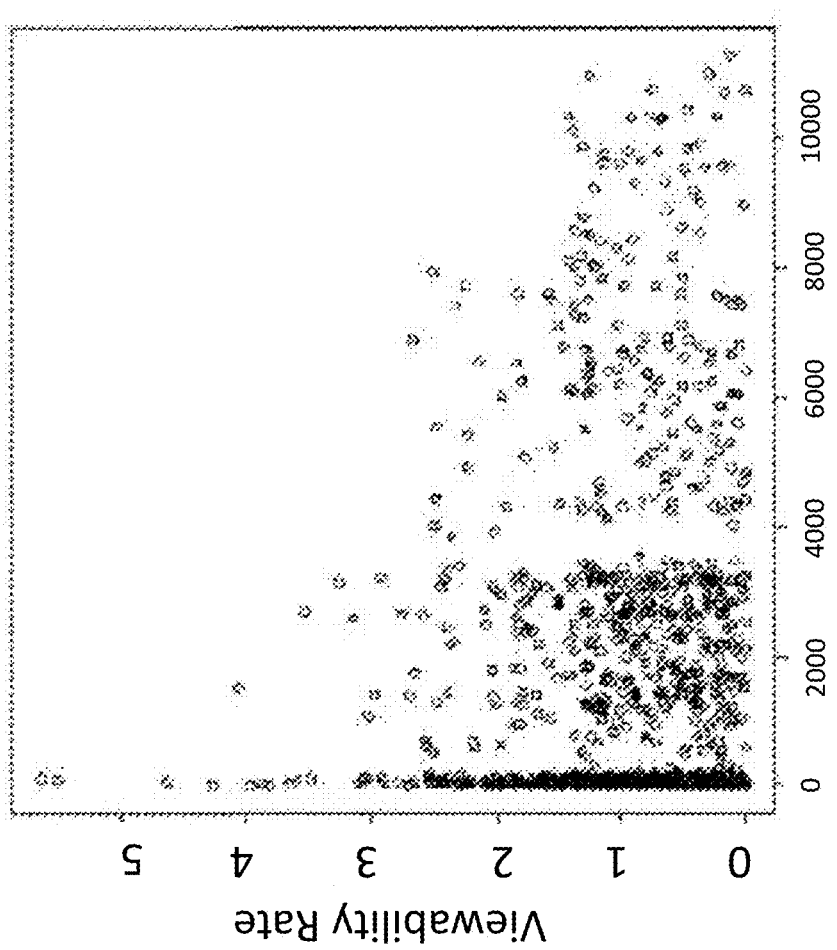
FIG. 12 shows the correlation between elapsed time since the start of the program and the viewability rate.

Further, what kinds of situations lead to a high viewability rate was investigated. When little time elapses after the program begins (depending on the genre), the viewability rate is high. As TABLE 7 shows, there are noticeable differences between the average viewability rates of each genre. The viewability rate of news programs is low, whereas that of movies and music is high. FIG. 12 shows the correlation between elapsed time since the start of the program and the viewability rate. From FIG. 12, one can see that the viewability rate is higher when shorter time has elapsed since the start of the program.

TABLE 7

Average viewability rate by genre

| Genre | Viewability |
|---|---|
| Animation/Tokusatsu | 0.706 |
| Sports | 0.668 |
| Documentary | 0.907 |
| Drama | 0.807 |
| News | 0.814 |
| Variety shows | 0.988 |
| Film | 1.252 |
| Music | 1.359 |
| Hobby/Education | 0.816 |
| Tabloid shows | 0.776 |
| All | 0.939 |

This experimental study elucidates the relationship between CM, programs, and human viewing attitudes using an exemplary embodiment of the hardware and software components of the present invention. The most suitable method to determine the CM curve is the multinomial logit model.

The variables are analyzed that can be observed during CM to examine the relationship between the CM curve and these variables. In all the method employed, the variables of length of CM and viewability rate contribute the most to determining the CM curve. Since the discrimination rate of the monotonic shape type is high, discrimination is easier, whether unchanged or changed. In other words, the shape of the CM curve is not relevant to program characteristics such as genre and date. This indicates that when the CM broadcast time is longer, the audience gets tired of watching. Moreover, if the previous scene of the program is uninteresting to the audience, then they do not watch the next CM.

Applications of Viewer Engagement Data

Figure 13:
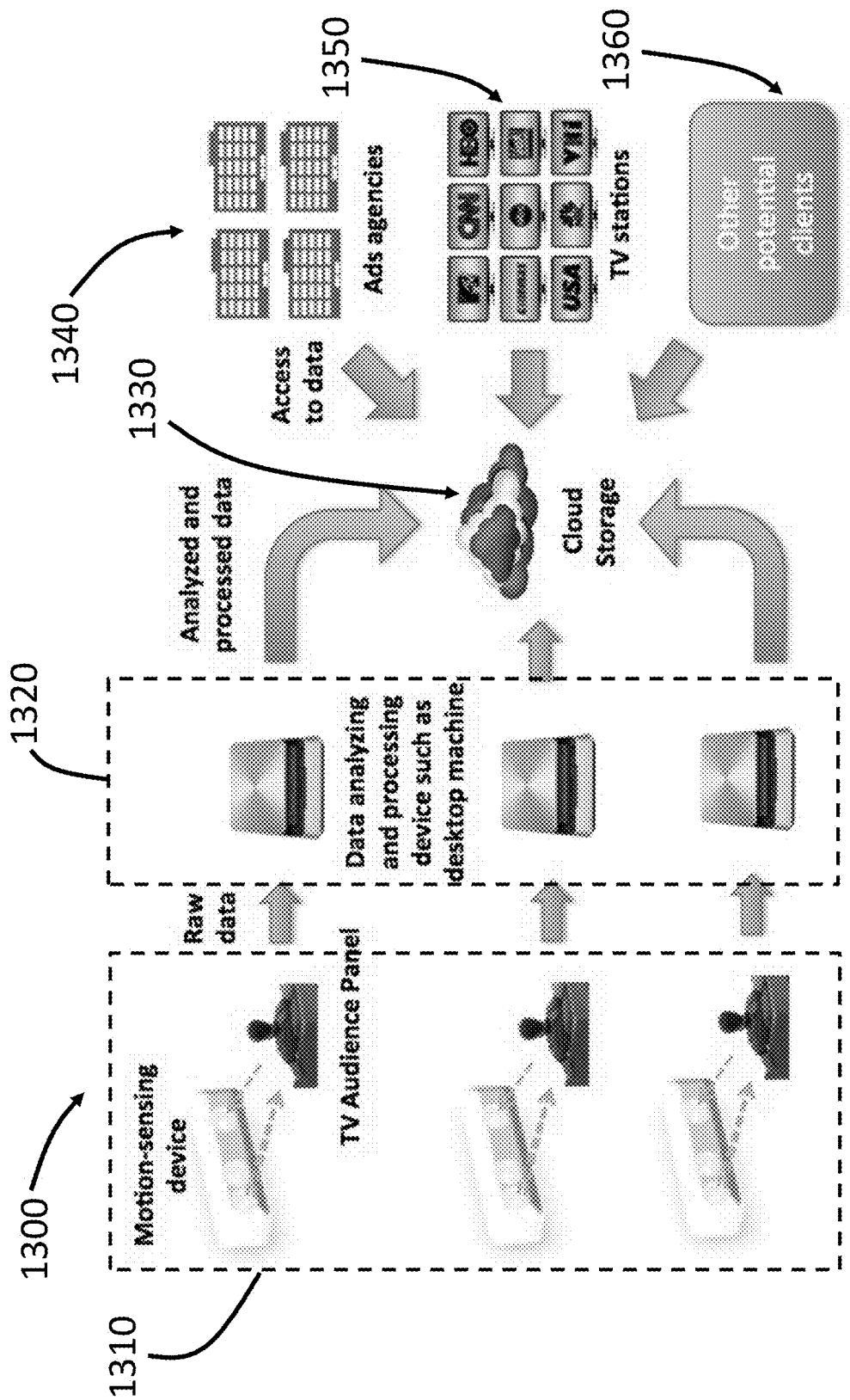
FIG. 13 illustrates communication of viewer engagement data acquired using the technology illustrated in FIGS. 1-12.

FIG. 13 illustrates a system of communication of data acquired using the methods and systems described herein. The system 1300 stores and processes raw data 1310 captured from TV audience panels through the motion-sensing devices, which is transferred to the computing device 1320 such as, but without limitation, the desktop machine. Then, methods of assessing viewer engagement can be performed on, for example, desktop machines to analyze and processes the data. The methods transform the after-analyzed data into performance-based TV ratings data that can be used to determine (1) who is really watching TV (who is in the audience), (2) how often the audience members look at the TV, and (3) the audience's reaction towards the TV programs and advertisements. This processed and/or summarized data is then transferred to a central storage location 1330, such as a server, on the cloud where third parties, including but not limited to TV advertising agencies 1340, TV networks 1350, and any other potential clients 1360 that might find the data useful, can conveniently access the data anytime, through the collection entity's software, an application programming interface, or a web portal, specifically developed for the collection entity's clients. Alternatively, the raw data 1310 collected by the sensors of the hardware component is transferred to a central storage 1330 on the cloud directly or indirectly through an Internet connection where it is analyzed by the software component and made available to interested third parties 1340-1360. A third party may optionally access the raw data through the system.

Figure 14:
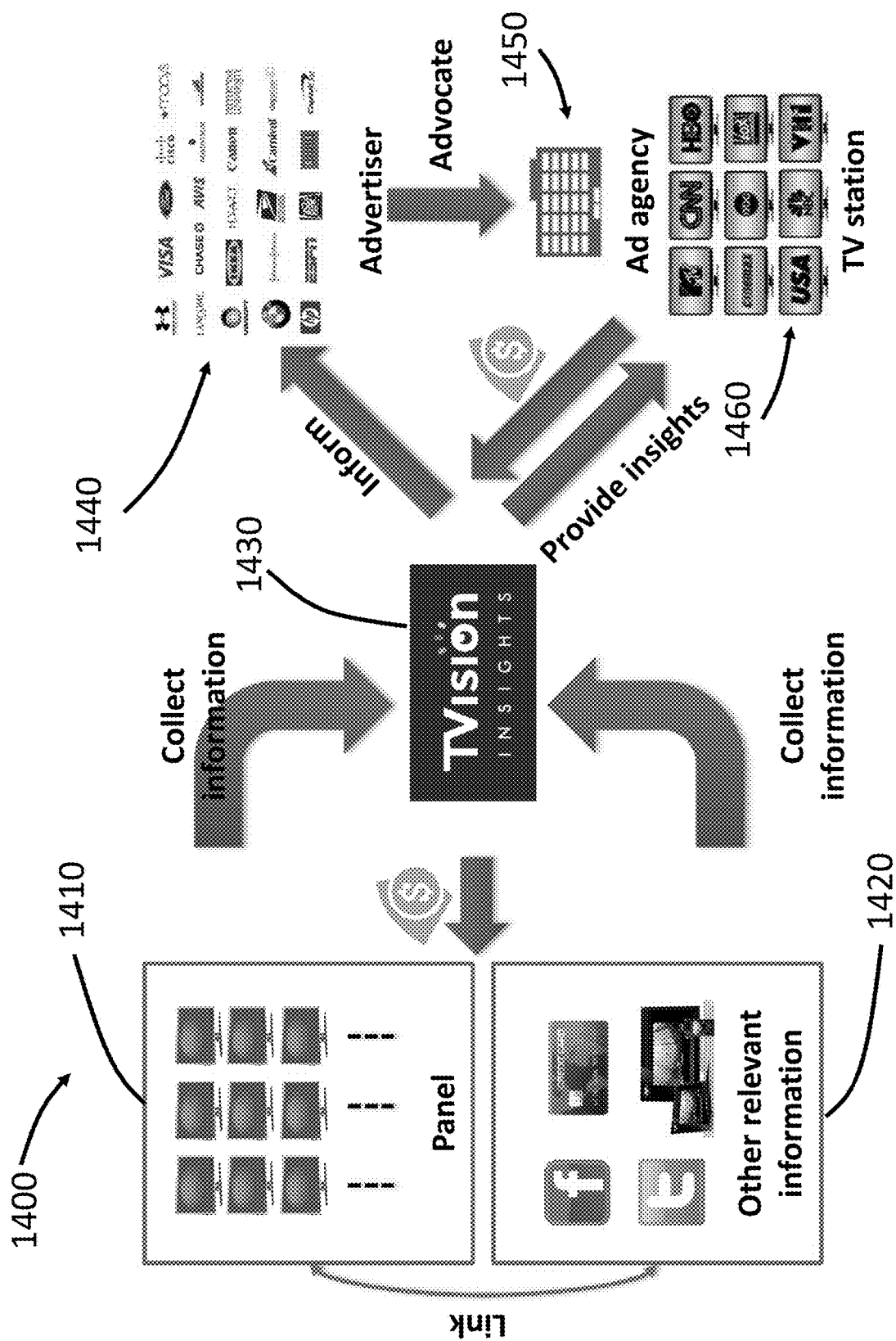
FIG. 14 illustrates dissemination and use of viewer engagement data acquired using the technology illustrated in FIGS. 1-12.

FIG. 14 illustrates basic elements of an example system 1400 that can utilize the data acquired and analyzed by the systems and methods described herein. The collection entity 1430 (e.g., TVision Insights) may compensate panel members 1410 (e.g., household members) who, in exchange for compensation or volunteering, allow for the placement of the hardware components depicted in FIG. 1 to be placed atop televisions in their household for the purpose of TV viewership data collection. Panel members may be asked to provide additional information 1420, including but not limited to, credit card transaction data, demographic and socio-economic information, social media account logins, and data from tablets, smartphones, and other devices. This data is collected, video and IR images are recorded using the system depicted in FIG. 1, and the video can be analyzed by the methods described in FIGS. 2-6. Once analyzed, data describing the video may be transmitted to the collection entity 1430, which may then sell or otherwise provide the data to advertisers 1440, TV stations 1460, TV agencies 1450, and other interested third parties. Optionally, the collection entity 1430 may provide access to raw collected data for separate analysis. As part of the disclosed business model, the collection entity 1430 can motivate advertisers 1440 to encourage their TV agencies 1450 to purchase this data.

Figure 15:
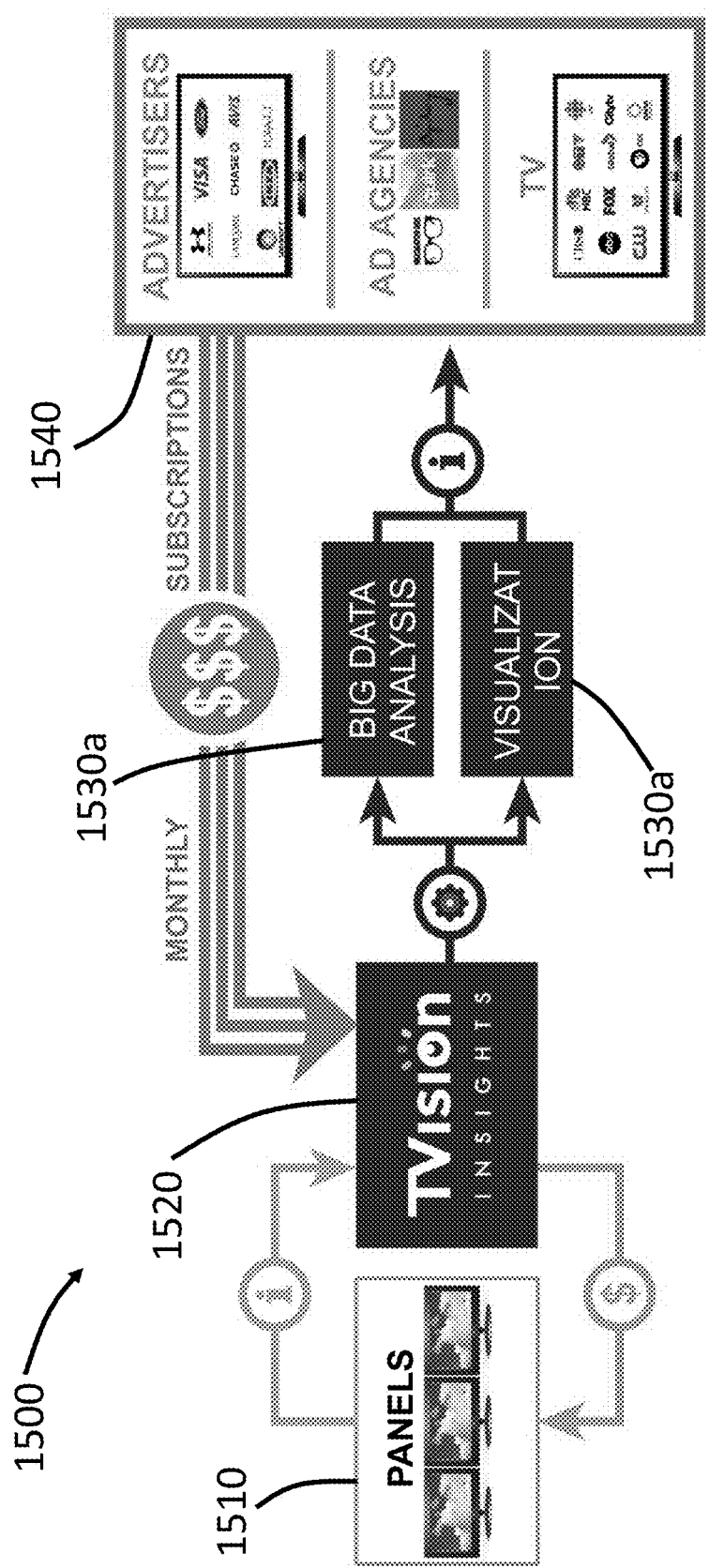
FIG. 15 illustrates big data analysis and visualization of viewer engagement data acquired using the technology illustrated in FIGS. 1-12.

FIG. 15 illustrates big data analysis and visualization based on data acquired in methods of assessing viewer engagement. In these models 1500, the collection entity 1520 (e.g., TVision INSIGHTS shown in FIG. 15) can collect data from households 1510 having TV sets. In return, the participating households 1510 can receive monetary compensation (or other benefit) from collection entity 1520. The collection entity 1520 then analyzes the data collected from the participating households using big data analysis 1530a and visualization techniques 1530b to derive information such as the effectiveness of certain TV program or advertisement. This data can be then provided to advertisers, advertising agencies, TV stations, or other content providers or promoters (collectively referred to as customers 1540) to instruct them to improve the effectiveness of their programs. In one example, the customers 1540 can subscribe this data service to the collection entity 1520 on a monthly basis with monthly fees. In another example, the customers 1540 can buy data relating to a particular video (e.g., campaign video, special advertisement during sports events, etc.) from the collection entity 1520.

Figure 16:
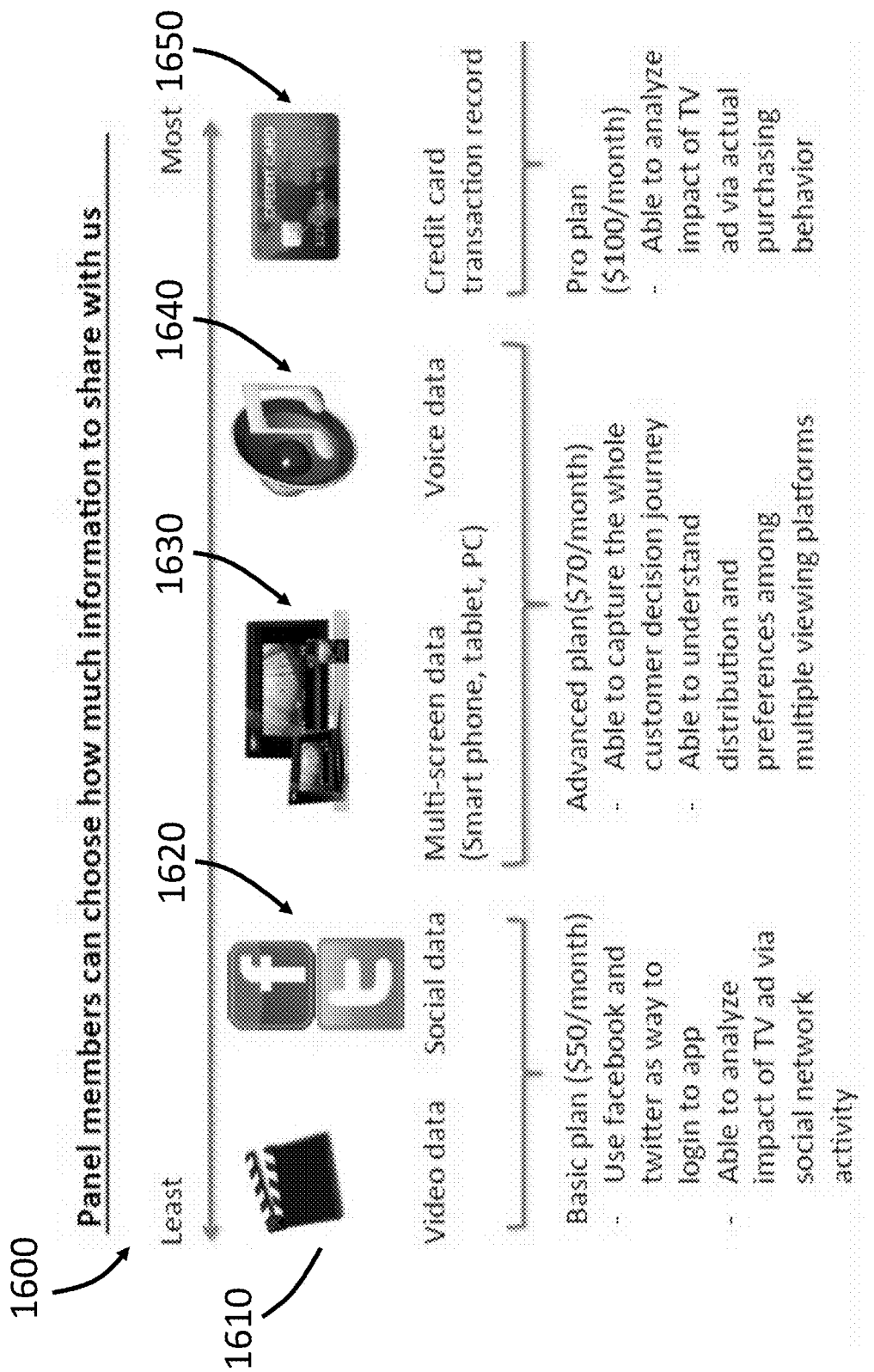
FIG. 16 shows a model for acquiring additional data to complement viewer engagement data acquired using the technology illustrated in FIGS. 1-12.

FIG. 16 illustrates examples of collection of additional information 1600 from individuals and households (TV audiences) participating in viewer engagement data collection. The TV audiences can represent national and/or local demographics useful to interested third parties. The collection entity can collect video data 1610 and the demographic information and, packaged with data gathered by the system and analyzed by the methods regarding TV viewership, provide this information to customers for compensation. Examples of information that may be collected from TV audiences include any and all information that can be obtained through social media profiles 1620 such as, but not limited to, TWITTER, Instagram, FACEBOOK, among others. The information can further include video data and audio data 1640 obtained from the systems (including both television audio and audio such as conversation originating from individuals in the household), multi-screen data 1630 including smartphone and tablet search habits, internet search history, email account information, and credit card transaction data 1650. This list is not exhaustive, and should not be interpreted as limiting.

The collected information and data enables a collection entity to accurately evaluate the impact of TV advertisements-including unprecedented measurements of individual demographics, which are valuable to the advertisers. The advertisers can use the data to determine which ad slots would be a best fit for their targeted audience. The message can also be more pertinent to the type of audience and can effectively lead to purchasing behavior, increasing return of investment (ROI) for the advertisers.

TV networks can also benefit from the disclosed invention as they will be able to glean more accurate ratings of their TV programs, audience type, reactions, and predictive ad slot value. This will allow them to improve their programs to better fit the type of audience and eliminate non-popular ones, in addition to determining which ad slots will have the highest value for a particular target demographic. The data can also be used to compare programs across multiple channels at the same or different time slots for a comparative evaluation of programs and advertising. Similarly, TV audience data and behavior can be collected and compared for any given programming time slot to streaming content. TV pilot programs can also be evaluated using the system before ordering episodes.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of quantifying viewer engagement with a video shown on a display, the method comprising:
   acquiring, with at least one camera, image data of a viewing area in front of the display while the video is being shown on the display;
   estimating, with at least one processor and based at least in part on the image data, viewer data comprising a number of people present in the viewing area while the video is being shown on the display and a number of people engaged with the video in the viewing area;
   acquiring, with a microphone, audio data representing a soundtrack of the video emitted by a speaker coupled to the display;
   determining, with the at least one processor, an identity of the video based at least in part on the audio data;
   quantifying the viewer engagement with the video based at least in part on the viewer data;
   quantifying the viewer engagement of the video based at least in part on a number of people present in the viewing area while the video is being shown on the display and a number of people engaged with the video in the viewing area at each house household in a plurality of households, wherein quantifying the viewer engagement comprises estimating an attention rate for the video, the attention rate representing a ratio of number of people present in the viewing area while the video is being shown on the display and a number of people engaged with the video in the viewing area, and for each unique video in a plurality of videos, determining an attention index based on the attention rates of the videos in the plurality of videos; and
   estimating a viewer count and a positive duration ratio based on the image data and on demographic information about each household in the plurality of households, the viewer count representing the number of people engaged with each unique video and the positive duration ratio representing a ratio of total time spent by people in the plurality of households watching the unique video to a duration of the unique video.

2. The method of claim 1, wherein quantifying viewer engagement comprises performing with the at least one processor one or more of:
   facial tracking;
   eyeball tracking;
   facial recognition; and
   sentiment analysis.

3. The method of claim 2, wherein performing sentiment analysis comprises facial landmark detection and emotion analysis.

4. The method of claim 2, performing sentiment analysis comprises acquiring skeletal frame data.

5. The method of claim 1, further comprising estimating demographic information for each person in the viewing area from the image data.

6. The method of claim 5, wherein estimating the demographic information comprises estimating age, gender, ethnicity group, and facial expression.

7. The method of claim 1, wherein determining that the video is a unique video is based at least in part on audio data of the viewing area via a signal fingerprinting technique.

8. The method of claim 1, further comprising the at least one processor generating a plurality of commercial message curves comprising patterns that show time series curves of viewability rates between two scenes in a video.

9. The method of claim 8, wherein personal viewing rate of commercial messages between scenes may be constant, while a viewability rate may change.

10. The method of claim 9, wherein variables of a length of a commercial message and a viewability rate can significantly contribute to the shape of a CM curve.

11. The method of claim 10, wherein a multinomial logit model is employed in determining a commercial message curve.

12. A method of quantifying viewer engagement with a video shown on a display, the method comprising:
   acquiring, with at least one camera, image data of a viewing area in front of the display while the video is being shown on the display;
   estimating, with at least one processor and based at least in part on the image data, viewer data comprising a number of people present in the viewing area while the video is being shown on the display and a number of people engaged with the video in the viewing area;
   acquiring, with a microphone, audio data representing a soundtrack of the video emitted by a speaker coupled to the display;
   determining, with the at least one processor, an identity of the video based at least in part on the audio data;
   quantifying the viewer engagement with the video based at least in part on the viewer data;
   quantifying the viewer engagement of the video based at least in part on a number of people present in the viewing area while the video is being shown on the display and a number of people engaged with the video in the viewing area at each house household in a plurality of households, wherein quantifying the viewer engagement comprises estimating an attention rate for the video, the attention rate representing a ratio of number of people present in the viewing area while the video is being shown on the display and a number of people engaged with the video in the viewing area, and for each unique video in a plurality of videos, determining an attention index based on the attention rates of the videos in the plurality of videos;

estimating a viewer count and a positive duration ratio based on the image data and on demographic information about each household in the plurality of households, the viewer count representing the number of people engaged with each unique video and the positive duration ratio representing a ratio of total time spent by people in the plurality of households watching the unique video to a duration of the unique video;

determining an identity of each person present in the viewing area based at least in part on the image data; and wherein quantifying the viewer engagement of the video comprises quantifying the viewer engagement for each identified person.

13. A method of quantifying viewer engagement with a video shown on a display, the method comprising:

acquiring, with at least one camera, image data of a viewing area in front of the display while the video is being shown on the display;

estimating, with at least one processor and based at least in part on the image data, viewer data comprising a number of people present in the viewing area while the video is being shown on the display and a number of people engaged with the video in the viewing area;

acquiring, with a microphone, audio data representing a soundtrack of the video emitted by a speaker coupled to the display;

determining, with the at least one processor, an identity of the video based at least in part on the audio data;

quantifying the viewer engagement with the video based at least in part on the viewer data;

determining that a video is a unique video in a plurality of videos;

in response to determining that the video is a unique video estimating (i) a viewing rate and (ii) a watching rate based on the image data and on demographic information about each household in a plurality of households, the viewing rate representing a ratio of a total number of people in the viewing areas to a total number of displays showing videos and the watching rate representing a ratio of a total number of people in households with displays showing videos to a total number of people in the plurality of households;

determining a viewability index based on the viewing rate and the watching rate;

estimating (iii) a viewer count and (iv) a positive duration ratio based on the image data and on the demographic information about each household in the plurality of households, the viewer count representing a total number of people engaged with the unique video and the positive duration ratio representing a ratio of total time spent by people in the plurality of households watching the unique video to a duration of the unique video; and weighting the viewability index based on the viewer count and the positive duration ratio.

14. The method of claim 13, further comprising normalizing the viewability index across unique videos in the plurality of videos.

15. A system for quantifying viewer engagement with a video playing on a display, the system comprising:

at least one camera, disposed to image a viewing area in front of the display, to acquire image data of the viewing area;

a microphone, disposed in proximity to the display, to acquire audio data representing a soundtrack of the video emitted by a speaker coupled to the display;

a memory, operably coupled to the at least one camera and the microphone, to store processor-executable instructions, the memory comprising a buffer to store the image data and the audio data; and at least one processor, operably coupled to the at least one camera, the microphone, and the memory, wherein upon execution of the processor-executable instructions, the at least one processor performs a method comprising:

acquiring, with at least one camera, image data of a viewing area in front of the display while the video is being shown on the display;

estimating, with at least one processor and based at least in part on the image data, viewer data comprising a number of people present in the viewing area while the video is being shown on the display and a number of people engaged with the video in the viewing area;

acquiring, with a microphone, audio data representing a soundtrack of the video emitted by a speaker coupled to the display;

determining, with the at least one processor, an identity of the video based at least in part on the audio data;

quantifying the viewer engagement with the video based at least in part on the viewer data; and estimating a viewer count and a positive duration ratio based on the image data and on demographic information about each household in the plurality of households, the viewer count representing the number of people engaged with each unique video and the positive duration ratio representing a ratio of total time spent by people in the plurality of households watching the unique video to a duration of the unique video.

16. The system of claim 15, wherein the method further comprises:

quantifying viewer engagement, comprising performing with the at least one processor one or more of:
facial tracking;
eyeball tracking;
facial recognition; and
sentiment analysis.

17. The system of claim 16, wherein performing sentiment analysis comprises facial landmark detection and emotion analysis.

18. The system of claim 16, wherein performing sentiment analysis comprises acquiring skeletal frame data.

19. The system of claim 16, wherein the method further comprises quantifying the viewer engagement of the video based at least in part on a number of people present in the viewing area while the video is being shown on the display and a number of people engaged with the video in the viewing area at each house household in a plurality of households.

20. The system of claim 15, wherein quantifying the viewer engagement comprises:

estimating an attention rate for the video, the attention rate representing a ratio of number of people present in the viewing area while the video is being shown on the display and a number of people engaged with the video in the viewing area; and for each unique video in a plurality of videos, determining an attention index based on the attention rates of the videos in the plurality of videos.

21. The system of claim 15, wherein the method further comprises:

determining that a video is a unique video in a plurality of videos;

in response to determining that the video is a unique video estimating (i) a viewing rate and (ii) a watching rate based on the image data and on demographic information about each household in a plurality of households, the viewing rate representing a ratio of a total number of people in the viewing areas to a total number of displays showing videos and the watching rate representing a ratio of a total number of people in households with displays showing videos to a total number of people in the plurality of households; and determining a viewability index based on the viewing rate and the watching rate.

22. The system of claim 15, wherein the method further comprises the at least one processor generating a plurality of commercial message curves comprising patterns that show time series curves of viewability rates between two scenes in a video.

23. A system for quantifying viewer engagement with a video playing on a display, the system comprising:

at least one camera, disposed to image a viewing area in front of the display, to acquire image data of the viewing area;

a microphone, disposed in proximity to the display, to acquire audio data representing a soundtrack of the video emitted by a speaker coupled to the display;

a memory, operably coupled to the at least one camera and the microphone, to store processor-executable instructions, the memory comprising a buffer to store the image data and the audio data; and at least one processor, operably coupled to the at least one camera, the microphone, and the memory, wherein upon execution of the processor-executable instructions, the at least one processor performs a method comprising:

acquiring, with at least one camera, image data of a viewing area in front of the display while the video is being shown on the display;

estimating, with at least one processor and based at least in part on the image data, viewer data comprising a number of people present in the viewing area while the video is being shown on the display and a number of people engaged with the video in the viewing area;

acquiring, with a microphone, audio data representing a soundtrack of the video emitted by a speaker coupled to the display;

determining, with the at least one processor, an identity of the video based at least in part on the audio data;

quantifying the viewer engagement with the video based at least in part on the viewer data;

estimating a viewer count and a positive duration ratio based on the image data and on demographic information about each household in the plurality of households, the viewer count representing the number of people engaged with each unique video and the positive duration ratio representing a ratio of total time spent by people in the plurality of households watching the unique video to a duration of the unique video; and determining an identity of each person present in the viewing area based at least in part on the image data, wherein quantifying the viewer engagement of the video comprises quantifying the viewer engagement for each identified person.

24. A system for quantifying viewer engagement with a video playing on a display, the system comprising:

at least one camera, disposed to image a viewing area in front of the display, to acquire image data of the viewing area;

a microphone, disposed in proximity to the display, to acquire audio data representing a soundtrack of the video emitted by a speaker coupled to the display;

a memory, operably coupled to the at least one camera and the microphone, to store processor-executable instructions, the memory comprising a buffer to store the image data and the audio data; and at least one processor, operably coupled to the at least one camera, the microphone, and the memory, wherein upon execution of the processor-executable instructions, the at least one processor performs a method comprising:

acquiring, with at least one camera, image data of a viewing area in front of the display while the video is being shown on the display;

estimating, with at least one processor and based at least in part on the image data, viewer data comprising a number of people present in the viewing area while the video is being shown on the display and a number of people engaged with the video in the viewing area;

acquiring, with a microphone, audio data representing a soundtrack of the video emitted by a speaker coupled to the display;

determining, with the at least one processor, an identity of the video based at least in part on the audio data;

quantifying the viewer engagement with the video based at least in part on the viewer data;

estimating a viewer count and a positive duration ratio based on the image data and on demographic information about each household in the plurality of households, the viewer count representing the number of people engaged with each unique video and the positive duration ratio representing a ratio of total time spent by people in the plurality of households watching the unique video to a duration of the unique video; and determining an identity of each person present in the viewing area based at least in part on the image data, wherein quantifying the viewer engagement of the video comprises quantifying the viewer engagement for each identified person, and wherein quantifying the viewer engagement is carried out at a remote server.

25. A system for quantifying viewer engagement with a video playing on a display, the system comprising:

at least one camera, disposed to image a viewing area in front of the display, to acquire image data of the viewing area;

a microphone, disposed in proximity to the display, to acquire audio data representing a soundtrack of the video emitted by a speaker coupled to the display;

a memory, operably coupled to the at least one camera and the microphone, to store processor-executable instructions, the memory comprising a buffer to store the image data and the audio data; and at least one processor, operably coupled to the at least one camera, the microphone, and the memory, wherein upon execution of the processor-executable instructions, the at least one processor performs a method comprising:
- acquiring, with at least one camera, image data of a viewing area in front of the display while the video is being shown on the display;
- estimating, with at least one processor and based at least in part on the image data, viewer data comprising a number of people present in the viewing area while the video is being shown on the display and a number of people engaged with the video in the viewing area;
- acquiring, with a microphone, audio data representing a soundtrack of the video emitted by a speaker coupled to the display;
- determining, with the at least one processor, an identity of the video based at least in part on the audio data;
- quantifying the viewer engagement with the video based at least in part on the viewer data;
- estimating a viewer count and a positive duration ratio based on the image data and on demographic information about each household in the plurality of households, the viewer count representing the number of people engaged with each unique video and the positive duration ratio representing a ratio of total time spent by people in the plurality of households watching the unique video to a duration of the unique video;
- determining an identity of each person present in the viewing area based at least in part on the image data, wherein quantifying the viewer engagement of the video comprises quantifying the viewer engagement for each identified person, and wherein quantifying the viewer engagement is carried out at a remote server; and
- determining whether a predetermined video in the plurality of videos is being displayed on the display based at least in part on the audio data, wherein quantifying the viewer engagement is based at least in part on whether the predetermined video is being displayed.

* * * * *